United States Patent
Morgan et al.

(10) Patent No.: US 7,689,294 B2
(45) Date of Patent: Mar. 30, 2010

(54) SYSTEMS, METHODS, AND APPARATUS FOR PROVIDING CONTINUOUS POWER TO A FIXTURE IN A MANUFACTURING PROCESS

(75) Inventors: Christopher Michael Morgan, Dunlap, TX (US); Edgard Nascimento, Chattanooga, TN (US); Martin Tyman, Chattanooga, TN (US)

(73) Assignee: Automation Industrial Group, LLC, Chattanooga, TN (US)

( * ) Notice: Subject to any disclaimer, the term of this patent is extended or adjusted under 35 U.S.C. 154(b) by 283 days.

(21) Appl. No.: 11/692,102

(22) Filed: Mar. 27, 2007

(65) Prior Publication Data

US 2008/0163483 A1 Jul. 10, 2008

Related U.S. Application Data

(60) Provisional application No. 60/883,524, filed on Jan. 5, 2007.

(51) Int. Cl.
*G05B 11/01* (2006.01)
(52) U.S. Cl. .......................... 700/22; 700/114; 700/247; 700/248; 901/50; 29/791
(58) Field of Classification Search ................... 700/22, 700/114, 247, 248; 29/791; 901/30, 50
See application file for complete search history.

(56) References Cited

U.S. PATENT DOCUMENTS 5,244,406 A * 9/1993 Vranish ...................... 439/362
2006/0231371 A1* 10/2006 Moliere et al. ......... 198/341.09

FOREIGN PATENT DOCUMENTS

JP 2001-339875 * 12/2001
WO WO 2005/060068 * 6/2005

* cited by examiner

*Primary Examiner*—Albert DeCady
*Assistant Examiner*—Steven R Garland
(74) *Attorney, Agent, or Firm*—Sutherland Asbill & Brennan LLP

(57) ABSTRACT

Embodiments of the invention are directed to systems, methods, and apparatus for providing continuous power and utilities to a fixture in a manufacturing process. In one embodiment of the invention, a system with robot, such as a robotic arm, and a workstation can be deployed in a manufacturing process. A fixture associated with the manufacturing process can include a mount operable for receiving power from the robot or robot arm, and another mount operable for receiving power from the workstation. An associated control device, such as a programmable logic circuit, can selectively provide power via either mount depending on whether the fixture is mounted to the robot or robotic arm, or to the workstation.

33 Claims, 14 Drawing Sheets

SYSTEMS, METHODS, AND APPARATUS FOR PROVIDING CONTINUOUS POWER TO A FIXTURE IN A MANUFACTURING PROCESS

RELATED APPLICATION

This application claims priority to U.S. Provisional Ser. No. 60/883,524, entitled "Systems, Methods, and Apparatus for Providing Continuous Power to a Fixture in a Manufacturing Process," filed Jan. 5, 2007, the content of which is incorporated by reference.

FIELD OF THE INVENTION

This invention relates to robotics, and in particular, relates to systems, methods, and apparatus for providing continuous power and utilities to a fixture in a manufacturing process.

BACKGROUND OF THE INVENTION

Manufacturing facilities increasingly rely on robotic equipment to perform or otherwise assist personnel in performing manufacturing and process tasks. In some manufacturing facilities, particular tasks can be organized at one or more workstations to permit tasks to be efficiently performed. In certain instances, robotic equipment can be deployed by personnel at a workstation to perform or assist in performing the tasks. Each workstation can include one or more fixtures associated with the workstation depending on the tasks to be performed during a manufacturing process.

For example, at a bicycle manufacturing facility, a workstation for making bicycle frames can be used. Robotic equipment, such as a robotic arm, can be deployed at the workstation to perform various tasks including, but not limited to, welding, punching, cutting, bending, and fastening. In a bicycle frame assembly process, components for a bicycle frame can be arranged by personnel at a bicycle frame assembly workstation. Personnel can manually arrange the components into a suitable frame configuration using a bicycle frame assembly fixture. A fixture can include various clamps, sensors, and other power-driven devices to maintain an initial configuration of components to be assembled. When the components of the bicycle frame are ready to be assembled, a robotic arm can be activated to perform assembly tasks including, but not limited to, welding, bending and fastening to assemble the components of the bicycle frame mounted within or to the associated fixture.

Due to certain safety and design considerations, fixtures may not independently receive power from a power source, whereas robotic equipment such as robotic arms are typically connected to an independent power source. In order to provide power to a fixture of interest, personnel can operate robotic equipment such as a robotic arm, to dock or otherwise connect to the fixture. Once docked to the fixture, the robotic equipment can provide power to the fixture as well as perform its pre-assigned tasks. Using power supplied via the robotic equipment, personnel monitoring the fixture or otherwise performing tasks at the fixture can operate any power-driven devices such as clamps, sensors, and other devices associated with the fixture, and perform their intended tasks.

For example, a robotic arm may dock to a bicycle frame assembly fixture, and may manipulate or otherwise orient the fixture as needed with pre-arranged components of a bicycle frame mounted within or to the fixture. The robotic arm may perform several tasks on the bicycle frame such as welding and bending. However, when the robotic equipment such as the robotic arm is undocked or otherwise disconnected from the fixture, power is no longer supplied to the fixture via the robotic arm, and personnel cannot operate any power-driven devices such as clamps, sensors, and other devices associated with the fixture.

At certain times, the lack of power to a fixture can slow or otherwise hinder certain tasks associated with a fixture. For instance, if personnel need to adjust or otherwise manipulate or monitor clamps, sensors, and other power-driven devices associated with the fixture, robotic equipment such as a robotic arm must be docked or otherwise connected to provide power to these devices. In some instances, safety considerations while operating robotic equipment may limit or prohibit access of personnel to certain workstation areas adjacent to the fixture. In any instance, manufacturing process and cycle times may increase when power-driven devices associated with the fixture need to be adjusted, manipulated, or monitored, and no power to the fixture is readily available. Likewise, manufacturing costs increase accordingly when process and cycle times increase.

Therefore, a need exists for systems, methods, and apparatus for providing continuous power and utilities to a fixture in a manufacturing process.

SUMMARY OF THE INVENTION

Systems, methods, and apparatus according to various aspects and embodiments according to the invention address some or all of the above issues and combinations of them. They do so by providing at least one system, method, and apparatus for providing continuous power and utilities to a fixture in a manufacturing process. In one embodiment of the invention, a system with a robot, such as a robotic arm, and a workstation can be deployed in a manufacturing process. A fixture associated with the manufacturing process can include a mount operable for receiving power from the robot or robot arm, and another mount operable for receiving power from the workstation. An associated control device, such as a programmable logic circuit, can selectively provide power via either mount depending on whether the fixture is mounted to either or both the robot or robotic arm, or to the workstation. In addition, the associated control device can selectively provide other utilities, such as air and/or communications via a similar type mount depending on whether the fixture is mounted to either or both the robot or robotic arm, or to the workstation. In this manner, the fixture can receive continuous power and utilities during a manufacturing process, thereby reducing manufacturing process and cycle time and associated costs. Embodiments of the invention are not limited to a particular type of fixture, workstation, or robot operating in a certain process, but can also include other types of fixtures, workstations, and robots in various types of manufacturing and other process settings. Furthermore, embodiments of the invention can be adapted to implement a particular type of utility or various combinations of utilities depending the mounts selected and the requirement of the manufacturing process.

Embodiments of the invention can include a system for providing continuous power to a fixture in a manufacturing process. The system can include a workstation and a robot. In addition, the system can include a fixture with at least one mount operable to mount to and to receive power from the robot. Furthermore, the fixture can include at least one mount operable to mount to and to receive power from the workstation. The system can also include at least one control device operable to selectively transmit power to the fixture via at least one mount when the fixture is mounted to both the workstation and the robot.

In one aspect of this embodiment, the at least one control device is operable to selectively transmit power to the fixture via the workstation when the fixture is exclusively mounted to a workstation, or via the robot when the fixture is exclusively mounted to the robot.

In another aspect of this embodiment, the manufacturing process can include at least one of the following: a bicycle frame assembly process, a bicycle assembly process, a motorcycle assembly process, an automobile assembly process, or an appliance assembly process or plant.

In another aspect of this embodiment, the robot can include at least one of the following: a robotic arm, or automated equipment for use in a manufacturing process.

In yet another aspect of this embodiment, the workstation can include a base station in a manufacturing process.

In yet another aspect of this embodiment, the fixture can include a tool for use in a manufacturing process.

In yet another aspect of this embodiment, the at least one mount operable to mount to and to receive power from the robot can include at least one of the following: an ATI-type quick connect device, a QC-21 robotic tool changer connector device, or a or QC-310 robotic tool changer connector device.

In yet another aspect of this embodiment, the at least one mount operable to mount to and to receive power from the workstation can include at least one of the following: an ATI-type quick connect device, a QC-21 robotic tool changer connector device, or a or QC-310 robotic tool changer connector device.

In yet another aspect of this embodiment the at least one control device can include at least one of the following: a programmable logic controller, a processor, or a software program.

Another embodiment can include a system for providing continuous power from a power source to a fixture in a manufacturing process. The system can include a plurality of workstations, each workstation comprising a mount operable to receive a portion of a fixture and further operable to receive power from at least one power source, wherein the mount can transmit power to a fixture when the fixture is mounted to the respective workstation. In addition, the system can include a plurality of robots, each robot comprising a mount operable to receive a portion of a fixture and further operable to receive power from at least one power source, wherein the mount can transmit power to a fixture when the fixture is mounted to the respective robot. Furthermore, the system can include at least one fixture which includes a robot mount operable to receive a portion of a robot, wherein the robot mount is operable to transmit power to the at least one fixture when a robot is mounted to the at least one fixture. In addition, the at least one fixture can include a workstation mount operable to receive a portion of a workstation, wherein the workstation mount is operable to transmit power to the at least one fixture when the at least one fixture is mounted to a workstation. Moreover, the system can include at least one control device operable to selectively transmit power to the at least one fixture via a workstation or a robot when the at least one fixture is mounted to both the workstation and the robot and further operable to selectively transmit power to the at least one fixture via a workstation when the at least one fixture is exclusively mounted to the workstation, or via a robot when the at least one fixture is exclusively mounted to the robot.

Embodiments of the invention can also include a method for providing continuous power to a fixture in a manufacturing process. The method can include providing a workstation and a robot. The method can also include providing a fixture including a robot mount operable to receive a portion of a robot, wherein the robot mount is operable to transmit power to the fixture when a robot is mounted to the fixture. Furthermore, the fixture can include a workstation mount operable to receive a portion of a workstation, wherein the workstation mount is operable to transmit power to the fixture when a workstation is mounted to the fixture. In addition, the method can include manipulating the robot to mount the fixture to the workstation, wherein the robot can provide power via the robot mount to the fixture. Moreover, the method can include selectively providing power to the fixture from either the robot or the workstation when the fixture is mounted to both the robot and the workstation.

In one aspect of this embodiment, the method can include selectively providing power to the fixture via the workstation mount when the fixture is exclusively mounted to a workstation, or via the robot mount when the fixture is exclusively mounted to the robot.

In another aspect of this embodiment, the robot can include at least one of the following: a robotic arm, or automated equipment for use in a manufacturing process.

In another aspect of this embodiment, the fixture can include a tool for use in a manufacturing process.

In yet another aspect of this embodiment the robot mount can include at least one of the following: an ATI-type quick connect device, a QC-21 robotic tool changer connector device, or a or QC-310 robotic tool changer connector device.

In yet another aspect of this embodiment, the workstation mount can include at least one of the following: an ATI-type quick connect device, a QC-21 robotic tool changer connector device, or a or QC-310 robotic tool changer connector device.

In yet another aspect of this embodiment, the power to the robot or the workstation can be controlled by at least one of the following: a programmable logic controller, a processor, or a software program.

Yet another embodiment of the invention can include a method for providing continuous power to a fixture in a manufacturing process utilizing at least one workstation and at least one robot. The method can include mounting a robot to a fixture, wherein power can be transmitted to the fixture via the robot. In addition, the method can include mounting the fixture to a workstation. Furthermore, the method can include selectively providing power to the fixture from either the robot or the workstation when the fixture is mounted to both the robot and the workstation. Moreover, the method can include manipulating the robot to dismount the robot from the workstation, wherein power is transmitted to the fixture via the workstation.

In one aspect of this embodiment, the robot can include at least one of the following: a robotic arm, or automated equipment for use in a manufacturing process.

In another aspect of this embodiment, the fixture can include a tool for use in a manufacturing process.

In another aspect of this embodiment, selectively providing power to the fixture can be facilitated by at least one of the following: a programmable logic controller, a processor, or a software program.

Yet another embodiment of the invention can include an apparatus for providing continuous power to a fixture in a manufacturing process. The apparatus can be a fixture for use in a manufacturing process. The fixture can include at least one workstation mount operable to receive a portion of a workstation, the at least one workstation mount operable to transmit power from a power source, wherein the at least one workstation mount can provide power to the fixture when the fixture is mounted to a workstation. In addition, the fixture can include at least one robot mount operable to receive a portion of a robot, the at least one robot mount operable to transmit power from a power source, wherein the at least one robot mount can provide power to the fixture when the fixture is mounted to a robot. Moreover, the fixture can include at least one control device operable to selectively provide power to the fixture via the workstation mount or the robot mount when the fixture is mounted to both the workstation and the robot.

In one aspect of this embodiment, the at least one control device is operable to selectively provide power to the fixture via the workstation mount when the fixture is exclusively mounted to a workstation, or via the robot mount when the fixture is exclusively mounted to the robot.

In another aspect of this embodiment, the fixture can include a tool for use in a manufacturing process.

In another aspect of this embodiment, the at least one control device can include at least one of the following: a programmable logic controller, a processor, or a software program.

Another embodiment of the invention can include a method of using a fixture in a manufacturing process. The method can include providing a fixture comprising a workstation mount operable to mount to a workstation, the fixture further comprising a robot mount operable to mount to a robot. In addition, the method can include manipulating the fixture to mount to a workstation. Furthermore, the method can include selectively providing power to the fixture via the workstation mount or via the robot mount when the fixture is mounted to both the workstation and the robot.

In one aspect of this embodiment, the method can include selectively providing power to the fixture via the workstation mount when the fixture is exclusively mounted to a workstation, or via the robot mount when the fixture is exclusively mounted to the robot.

In another aspect of this embodiment, the method can include manipulating the fixture to dismount from the workstation, wherein power is transmitted to the fixture via the robot.

In another aspect of this embodiment, the fixture can include a tool for use in a manufacturing process.

In another aspect of this embodiment, selectively providing power to the fixture can be facilitated by at least one of the following: a programmable logic controller, a processor, or a software program.

Yet another embodiment of the invention can include an apparatus for providing continuous power to a fixture in a manufacturing process. The apparatus can be a workstation for use in a manufacturing process. The workstation can include at least one fixture mount operable to receive a portion of a fixture, the at least one fixture mount operable to transmit power from a power source, wherein the at least one fixture mount can provide power to the fixture when the fixture is mounted to a workstation. Furthermore, the workstation can include at least one control device operable to selectively provide power to the fixture via the at least one fixture mount when the fixture is mounted to both the workstation and a robot.

In one aspect of this embodiment, the at least one control device is operable to selectively provide power to the fixture via the at least one fixture mount when the fixture is exclusively mounted to a workstation, or via the robot when the fixture is exclusively mounted to the robot.

In another aspect of this embodiment, the fixture comprises a tool for use in a manufacturing process.

In another aspect of this embodiment, the at least one control device can include at least one of the following: a programmable logic controller, a processor, or a software program.

Another embodiment of the invention can include a method of using a workstation in a manufacturing process with a robot. The method can include providing a workstation with at least one fixture mount operable to receive a portion of a fixture, the at least one fixture mount operable to transmit power from a power source, wherein the at least one fixture mount can provide power to the fixture. In addition, the method can include manipulating a fixture to mount to the workstation via the at least one fixture mount. Furthermore, the method can include selectively providing power to the fixture via the at least one fixture mount when the fixture is mounted to both the workstation and a robot.

In one aspect of this embodiment, the method can include selectively providing power to the fixture via the at least one fixture mount when the fixture is exclusively mounted to the workstation, or via the robot when the fixture is exclusively mounted to the robot.

In another aspect of this embodiment, the fixture comprises a tool for use in a manufacturing process.

In another aspect of this embodiment, selectively providing power to the fixture can be facilitated by at least one of the following: a programmable logic controller, a processor, or a software program.

Yet another embodiment of the invention can include an apparatus for providing continuous power to a fixture in a manufacturing process. The apparatus can be a robot for use in a manufacturing process with a workstation. The robot can include at least one fixture mount operable to receive a portion of a fixture, the at least one fixture mount operable to transmit power from a power source, wherein the at least one fixture mount can provide power to the fixture. In addition, the robot can include at least one control device operable to selectively provide power to the fixture via the at least one fixture mount when the fixture is mounted to both the robot and a workstation.

In one aspect of this embodiment, the at least one control device is operable to selectively provide power to the fixture via the at least one fixture mount when the fixture is exclusively mounted to the robot, or via a workstation when the fixture is exclusively mounted to the workstation.

In another aspect of this embodiment, the fixture can include a tool for use in a manufacturing process.

In another aspect of this embodiment the at least one control device can include at least one of the following: a programmable logic controller, a processor, or a software program.

In another aspect of this embodiment, the robot can include a robot arm.

Yet another embodiment of the invention can include method of using a robot in a manufacturing process with a workstation. The method can include providing a robot with at least one fixture mount operable to receive a portion of a fixture, the at least one fixture mount operable to transmit power from a power source, wherein the at least one fixture mount can provide power to the fixture. In addition, the method can include manipulating the robot to mount to a fixture via the at least one fixture mount. Furthermore, the method can include selectively providing power to the fixture via the at least one fixture mount when the fixture is mounted to both the robot and a workstation.

In one aspect of this embodiment, the method can include selectively providing power to the fixture via the at least one fixture mount when the fixture is exclusively mounted to the robot, or via a workstation when the fixture is exclusively mounted to the workstation.

In another aspect of this embodiment, the fixture can include a tool for use in a manufacturing process.

In another aspect of this embodiment, selectively providing power to the fixture can be facilitated by at least one of the following: a programmable logic controller, a processor, or a software program.

Another embodiment of the invention can include a system for providing at least one continuous utility to a fixture in a manufacturing process. The system can include a workstation and a robot. In addition, the system can include a fixture with at least one mount operable to mount to and to receive at least one utility from the robot. Furthermore, the fixture can include at least one mount operable to mount to and to receive the at least one utility from the workstation. The system can also include at least one control device operable to selectively transmit the at least one utility to the fixture via at least one mount when the fixture is mounted to both the workstation and the robot.

In one aspect of this embodiment, the at least one utility can include at least one of the following: communications, air, or power.

Another embodiment of the invention can include a method for providing at least one continuous utility to a fixture in a manufacturing process. The method can include providing a workstation and a robot. The method can also include providing a fixture including a robot mount operable to receive a portion of a robot, wherein the robot mount is operable to transmit at least one utility to the fixture when a robot is mounted to the fixture. Furthermore, the fixture can include a workstation mount operable to receive a portion of a workstation, wherein the workstation mount is operable to transmit the at least one utility to the fixture when a workstation is mounted to the fixture. In addition, the method can include manipulating the robot to mount the fixture to the workstation, wherein the robot can provide the at least one utility via the robot mount to the fixture. Moreover, the method can include selectively providing the at least one utility to the fixture from either the robot or the workstation when the fixture is mounted to both the robot and the workstation.

In one aspect of this embodiment the at least one utility can include at least one of the following: communications, air, or power.

Therefore various systems, processes, and apparatus according to various embodiments of the invention can include systems, methods, and apparatus for providing continuous power to a fixture in a manufacturing process.

Other systems, methods, and apparatus according to various embodiments of the invention will become apparent with respect to the remainder of this document.

DETAILED DESCRIPTION OF EMBODIMENTS OF THE INVENTION

Figure 1:
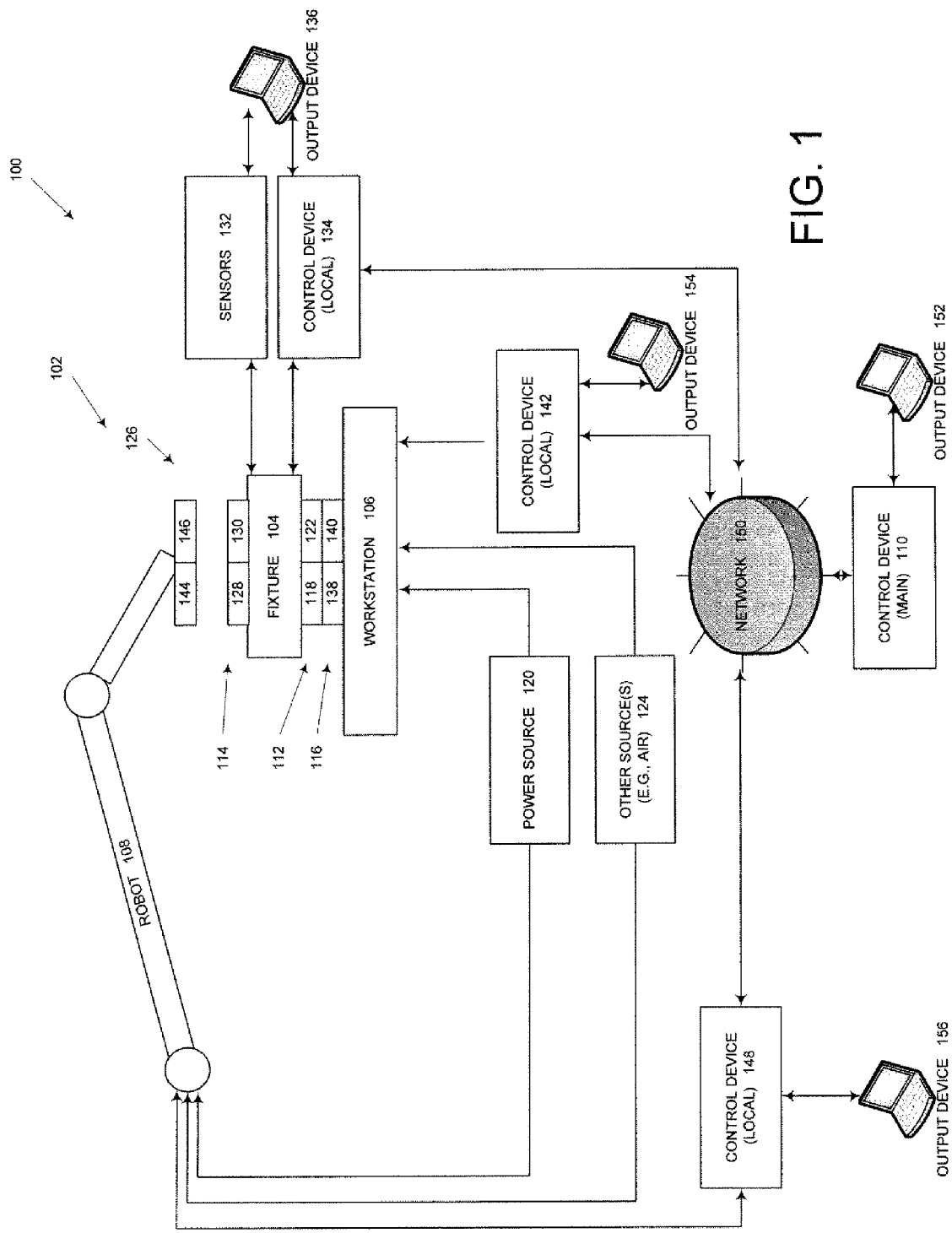
FIG. 1 is an illustration of an example system with a fixture mounted to a workstation in accordance with an embodiment of the invention.
Figure 2:
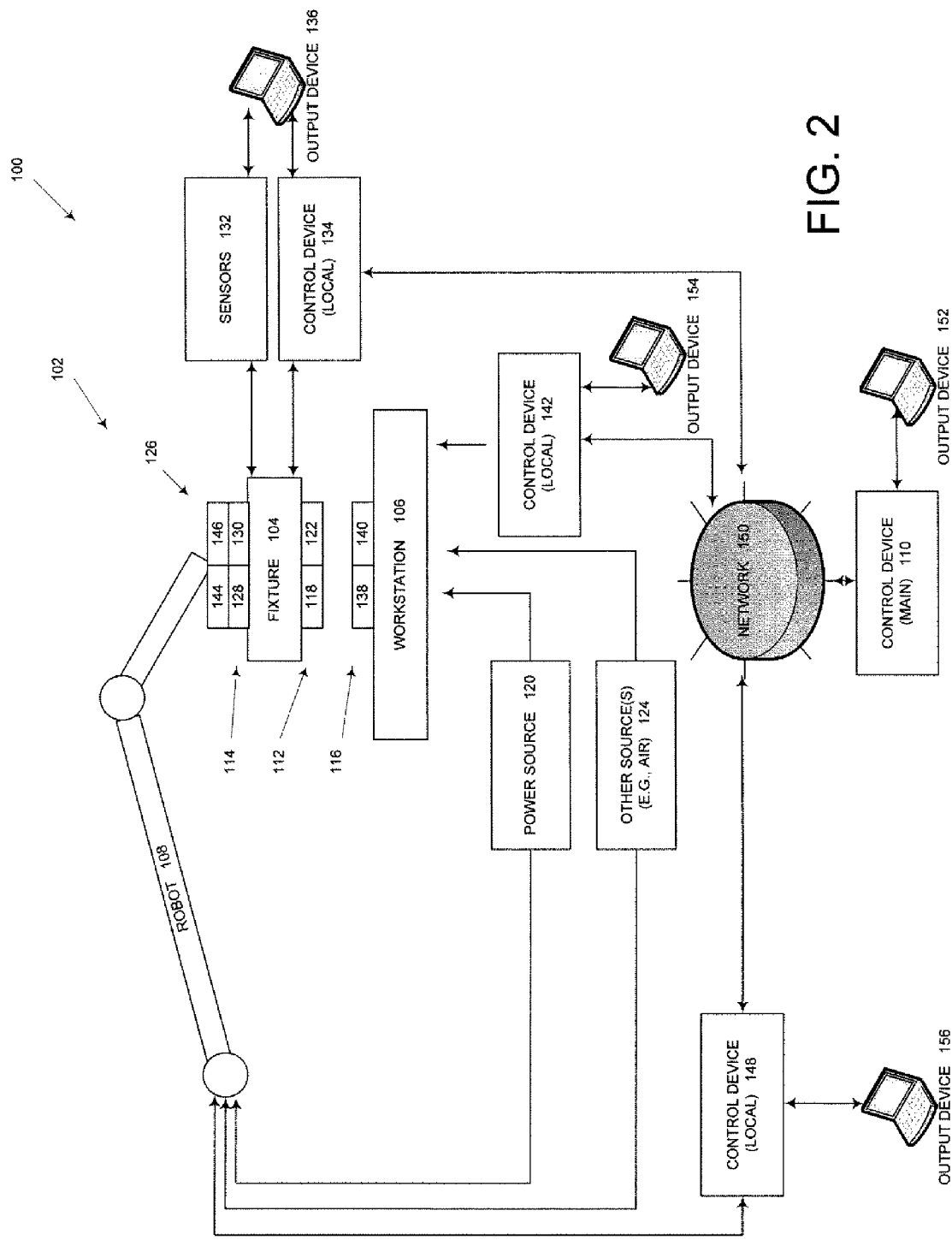
FIG. 2 is an illustration of an example system with a robot mounted to a fixture in accordance with an embodiment of the invention.

Embodiments of the invention relate to systems, methods, and apparatus for providing continuous power to a fixture in a manufacturing process. An example environment and system in accordance with an embodiment of the invention are shown in FIGS. 1 and 2. FIGS. 1 and 2 illustrate an example manufacturing environment 100 for an example system 102 in accordance with various embodiments of the invention. For example, a manufacturing environment can include, but is not limited to, a bicycle frame assembly process, a bicycle assembly process or plant, a motorcycle assembly process or plant, an automobile assembly process or plant, and an appliance assembly process or plant.

The terms "workstation", "docking station", and "base station" may be used interchangeably within this specification without any limiting effect, and the various uses of these terms are intended to have the same or similar meanings.

Furthermore, the terms "fixture" and "tool" may be used interchangeably within this specification without any limiting effect, and the various uses of these terms are intended to have the same or similar meanings.

In addition, the terms "robot", "robotic arm", and "robot arm" may be used interchangeably within this specification without any limiting effect, and the various uses of these terms are intended to have the same or similar meanings.

Further, the terms "utilities" and "facilities" may be used interchangeably within this specification without any limiting effect, and the various uses of these terms are intended to have the same or similar meanings.

Using the example system 102 illustrated in FIGS. 1 and 2, example apparatus described in FIGS. 4-10, the example methods described in FIGS. 11-14 can be implemented. The system 102 shown in FIGS. 1 and 2 includes a fixture 104, a workstation 106, a robot 108, and a centralized or main control device 110. The configuration and arrangement of the components shown and described with respect to FIGS. 1 and 2 are shown by way of example only, and other configurations and arrangements of system components can exist in accordance with other embodiments of the invention.

In the embodiment shown in FIG. 1, the fixture 104 is "docked" or mounted to the workstation 106. The fixture 104 can receive power and/or other utilities, such as air or communications, via the workstation 106. Manufacturing process personnel, such as a user (not shown) can utilize the power, air, communications, or other utilities to facilitate various manufacturing processes, such as assembling a bicycle frame components, with respect to the fixture 104. When needed, the robot 108 can be instructed to "dock" or otherwise mount to the fixture 104 as shown in FIG. 2, and the fixture can be "undocked", dismounted, or released from the workstation 106. In both FIGS. 1 and 2, the main control device 110 can coordinate and facilitate the movement of the fixture 104 with the robot 108, and can selectively provide power, air, communications, or other utilities to the fixture 104 via the workstation 106 or the robot 108 as needed.

In general, the fixture 104 can be a fixture or tool for use in a manufacturing process. For example, a fixture 104 can be a fixture for use in a bicycle frame assembly process. The fixture 104 shown in FIG. 1 includes a workstation mount 112, and a robot mount 114. The workstation mount 112 is operable to receive a portion of a workstation, such as a corresponding mount 116 associated with the workstation

106. The workstation mount 112 can include a power mount 118 for communication with at least one power source, such as 120, wherein the power mount 118 can provide power to the fixture 104 when the fixture 104 is mounted to the workstation 106. Moreover, the workstation mount 112 can include one or more other mounts 122 in communication with one or more other sources, for example, an air or communications source 124, to provide air or communications to the fixture 104 when the fixture 104 is mounted to the workstation 106. An example of a suitable mount is an ATI-type quick change device, such as a QC-21 or QC-310 robotic tool changer connector device, distributed by ATI Industrial Automation of Apex, N.C., United States of America.

In addition, the fixture 104 includes a robot mount 114 operable to receive a portion of a robot such as a corresponding mount 126 associated with the robot 108. The robot mount 114 can include a power mount 128 in communication with at least one power source, such as 120, wherein the power mount 128 can provide power to the fixture 104 when the robot 106 is mounted to the fixture 104. Moreover, the robot mount 126 can include one or more other mounts 130 in communication with one or more other sources, for example, an air or communications source 124, to provide air or communications to the fixture 104 when the robot 108 is mounted to the fixture 104. An example of a suitable mount is an ATI-type quick change device, such as a QC-21 or QC-310 robotic tool changer connector device, distributed by ATI Industrial Automation of Apex, N.C., United States of America.

As shown, the fixture 104 can be in communication with one or more associated sensors 132 and a local control device 134. In general, the sensors 132 can provide various measurements or sensing capabilities which may be needed during a manufacturing process. Typically, the local control device 134 can facilitate communications, such as feedback and control signals, between the fixture 104 and a centralized or main control device 110. In at least one embodiment, one or more sensors, clamps, control devices, or other power-driven devices can be integrated into the fixture 104. An associated input/output (I/O) device, such as 136, can generate or otherwise display an output or other indicator associated with signals or other communications from either or both the sensors 132 and local control device 134. Alternatively, a user can provide an input to a sensor 132, local control device 134, or other associated device via the I/O device 136.

In one embodiment, control of the fixture 104, sensors 132, and any other associated devices can be facilitated by a user interacting with the local control device 134 and associated I/O device 136.

Typically, the workstation 106 can be a workstation or base station in a manufacturing process. For example, a workstation 106 can be a base station for use in a bicycle manufacturing process. In other system environments in accordance with the invention, multiple workstations associated with one or more manufacturing processes can exist. The workstation 106 shown in FIG. 1 includes a fixture mount 116. The fixture mount 116 is operable to receive a portion of a fixture, such as corresponding mount 112 associated with the fixture 104. The fixture mount 116 can include a power mount 138 in communication with at least one power source 120, wherein the power mount 138 can provide power to a fixture 104 when the fixture 104 is mounted to the workstation 106. Moreover, the fixture mount 116 can include one or more other mounts 140 in communication with one or more other sources, for example, an air or communications source 124 or another utility source, to provide air or communications, or another utility, to the fixture 104 when the fixture 104 is mounted to the workstation 106. An example of a suitable mount is an ATI-type quick change device, such as a QC-21 or QC-310 robotic tool changer connector device, distributed by ATI Industrial Automation of Apex, N.C., United States of America.

In one embodiment, the workstation 106 can be in communication with a control device, such as local control device 142. Typically, the local control device 142 can facilitate communications, such as feedback and control signals, between the workstation 106 and a centralized or main control device 110.

In one embodiment, control of the workstation 106, and any other associated devices can be facilitated by a user interacting with the local control device 142 and associated I/O device 154.

In general, a robot can be a robot arm or other automated equipment for use in a manufacturing process. For example, a robot 108 can be a robot arm for use in performing certain tasks, such as welding or tube bending, in a bicycle frame assembly process. The robot 108 shown in FIG. 1 includes a fixture mount 126. The fixture mount 126 is operable to receive a portion of a fixture, such as a corresponding mount 114 associated with the fixture 104. The fixture mount 126 can include a power mount 144 for communication with at least one power source, such as 120, wherein the power mount 144 can provide power to the fixture 104 when the robot 108 is mounted to the fixture 104. Moreover, the fixture mount 126 can include one or more other mounts 146 in communication with one or more other sources, for example, an air or communications source 124 or another utility source, to provide air or communications, or another utility, to the fixture 104 when the robot 108 is mounted to the fixture 104. An example of a suitable mount is an ATI-type quick connect device, such as a QC-21 or QC-310 robotic tool changer connector device, distributed by ATI Industrial Automation of Apex, N.C., United States of America.

In addition, the robot 108 can be in communication with a control device, such as a local control device 148. Typically, the local control device 148 can facilitate communications, such as feedback and control signals, between the robot 108 and a centralized or main control device 110.

In one embodiment, control of the robot 108, and any other associated devices can be facilitated by a user interacting with the local control device 148 and associated I/O device 156.

As shown in FIG. 1, both the workstation 106 and robot 108 can be in communication with at least one power source 120, and one or more other sources (e.g., air, communications) 124. Conventional power, air, and communications sources can be utilized, in addition to associated pumps, valves, routers, and other power, air, or communications transmission equipment.

Control of the fixture 104, workstation 106, and robot 108 can be facilitated by and coordinated by a control device, such as the main control device 110. In other embodiments, multiple fixtures, workstations, and robots can exist in a manufacturing environment, and control of some or all of the system components can be facilitated and coordinated by a control device, such as a main control device 110. In addition, the main control device 110 can coordinate some or all of the respective local control devices, such as 134, 142, and 148, associated with the fixture 104, workstation 106, and robot 108. In other embodiments, additional local control devices can exist, and the main control device 110 can coordinate some or all of the local control devices as needed. Generally, the main control device 110 and local control devices 134, 142, and 148 can each include a set of instructions. Those skilled in the art will recognize the various embodiments for such control devices, instructions, and the implementation of these devices and instructions in accordance with the invention. For example, the main control device can be a programmable logic controller (PLC) operable to execute a set of instructions. Example instructions can include, but are not limited to, instructions to one or more mounts, such as an ATI-type quick connect device, control of a power source, control of an air source, control of a utility source, and movement of a robot. Associated control devices, such as local control devices 134, 142, and 148, can be programmable logic controllers in communication with respective system components, such as the fixture 104, workstation 106, and robot 108. The main control device 110 can transmit signals to, and receive signals from, the local control devices 134, 142, and 148. In one embodiment signal transmission can be via direct mode of transmission, i.e. hardwire. In the embodiment shown, signal transmission can be via a network 150, such as a local area network (LAN), a serial-to-ethernet LAN, the Internet, or wide area network (WAN), which may include both wired and/or wireless communications.

In one embodiment, some or all of the control devices may be processors hosted by one or more processor-based platforms such as those implemented by Windows 98, Windows NT/2000, LINUX-based and/or UNIX-based operating platforms. Such processors and associated platforms can utilize one or more conventional programming languages such as DB/C, C, C++, UNIX Shell, and Structured Query Language (SQL) to accomplish various methods, routines, subroutines, and computer-executable instructions in accordance with the invention, including system functionality, data processing, and communications between functional components. For example, each of the control devices could include computer-executable instructions or an associated computer program. The various sets of computer-executable instructions or computer programs can be processed by one or more associated processors, or other computer hardware.

Associated I/O devices can be provided for each control device 110, 134, 142, 148. A user can view an output, such as a signal or indicator generated by the control device 110, 134, 142, 148. Alternatively, a user may provide an input or other instruction for a control device 110, 134, 142, 148, sensor 132, or other associated device via a respective I/O device 136, 152, 154, and 156.

In use, the system 102 shown in FIGS. 1 and 2 can provide continuous power for a fixture in a manufacturing process or environment. A user, such as a manufacturing process operator, can dock or mount a fixture 104 to a workstation 106, as shown in FIG. 1, and the main control device 110 can facilitate the transmission of power to the fixture 104 via the workstation 106. Using power supplied from the power source 120 via the workstation 106, the user can manipulate any number of power-driven devices associated with the fixture 104, such as sensors 132. Alternatively, the main control device 110 can facilitate the transmission of other utilities, such as air or communications, to the fixture 104 via the workstation 106. Using air, communications, or other utilities supplied from one or more other sources 124 via the workstation 106, the user can manipulate any number of power-driven devices associated with the fixture 104, such as sensors 132. In this manner, a user can manipulate the fixture 104, and perform any number of tasks with respect to the fixture 104.

When needed, a robot 108 can be manipulated automatically or by a user, and the robot 108 can be docked or mounted to the fixture 104. When the fixture 104 is docked or mounted to both the workstation 106 and the robot 108, the main control device 110 can selectively provide power to the fixture 104 via either the workstation 106 or the robot 108. That is, the main control device 110 can detect when the fixture 104 is docked or mounted to either or both the workstation 106 and the robot 108, and the main control device 110 can facilitate the transmission of power to the fixture 104 through either or both the workstation 106 and/or the robot 108. In this embodiment, power is typically transmitted via either the workstation 106 or the robot 108 when the fixture is docked or mounted to both the workstation 106 and the robot 108.

Furthermore, when the fixture 104 is undocked, dismounted, or otherwise released from the workstation 106, and the robot 108 is docked or mounted to the fixture 104, the main control device 110 can facilitate transmission of power to the fixture 104 via the robot 108. Using power supplied from the power source 120 via the robot 108, the robot 108 can manipulate any number of power-driven devices associated with the fixture 104. Alternatively, the main control device 110 can facilitate the transmission of other utilities, such as air and communications or other utilities, to the fixture 104 via the robot 108. Using air, communications, or other utilities supplied from one or more other sources 124 via the robot 108, the robot 108 can manipulate any number of power-driven devices associated with the fixture 104. In this manner, the robot 108 can manipulate the fixture 104, and perform any number of tasks with respect to the fixture 104.

In one aspect of the invention, a control device, such as the main control device 110, can include a safety device which can selectively control power, or other utilities, to either or both a workstation or a robot. In some instances, a safety device can cut off all power in the event of an emergency. In other instances, a safety device can provide sufficient "safety power" to reduce power to some or all system components, but maintain a predetermined amount of power for some system components to perform particular tasks or functions. For example, a suitable safety device can be an emergency power circuit shown and described with respect to FIG. 3.

Figure 3:
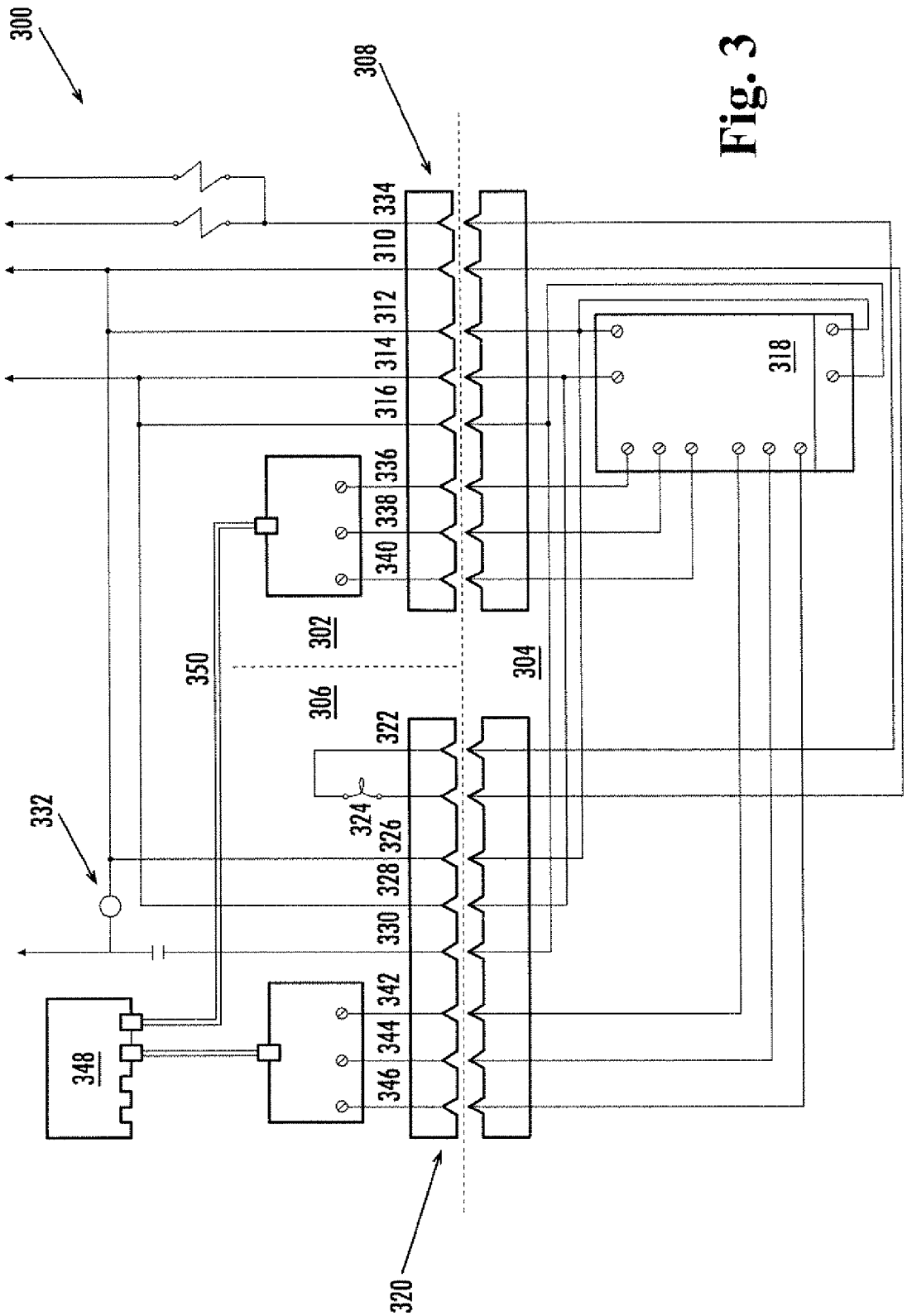
FIG. 3 is a schematic for an example circuit for a system in accordance with an embodiment of the invention.

FIG. 3 illustrates an example circuit 300 in accordance with an embodiment of the invention. The example circuit 300 shown in FIG. 3 can provide various instructions in a serial-to-ethernet LAN configuration for power, air, communications, or other utilities for a system shown in FIGS. 1 and 2. In the example shown, the circuit 300 shows connections between a robot 302 and a fixture 304, between the fixture 304 and a docking station 306, and between the docking station 306 and the robot 302. The robot 302, fixture 304, and docking station 306 can each be similar to like components shown in FIGS. 1 and 2 as 102, 104, and 106.

Power instructions to a system, such as 100, can be transmitted via the example circuit 300. Power instructions can include instructions for transmitting various amounts of power at certain times to different system components, such as the robot and/or workstation, depending on certain circumstances. As shown in the example circuit 300, power instructions can be transmitted from the robot 302 to the fixture 304 via an interface 308 with a set of associated pins. The interface 308 can represent the combination of one or more mounts associated with a robot, such as a power mount 144 and other mounts 146, and corresponding mounts associated with a fixture, such as a power mount 128 and other mounts 130. In this example, power instructions can be communicated between the robot 302 and fixture 304 via pin B 310, pin D 312, pin E 314, and pin E 316 associated with interface 308. Power instructions received by or transmitted from the fixture 304 can be handled by a programmable logic circuit (PLC) 318 associated with the fixture 304. In some embodiments, a PLC or similar type of logic or processing device can be associated with other system components, or may be located remotely from the fixture 304.

Furthermore, power instructions can be transmitted from the docking station 306 to the fixture 304 via another interface 320 with a set of associated pins. The interface 320 can represent the combination of one or more mounts associated with a docking station, such as a power mount 138 and other mounts 140, and corresponding mounts associated with a fixture, such as a power mount 118 and other mounts 122. In this example, power instructions can be communicated between the docking station 306 and fixture 304 via pin A 322, pin B 324, pin C 326, pin D 328, and pin E 330 associated with interface 320.

In one aspect of an embodiment, the example circuit in FIG. 3 limits or otherwise prevents any back feed of electrical current to particular system components, while maintaining a predetermined amount of electrical current to other system components. As shown in FIG. 3, a relay 332 associated with the docking station 306 can prevent back feeding of power to the fixture 304 when the fixture 304 is mounted to both the robot 302 and the docking station 306, and power instructions are transmitted to cut all power to the system components, including 302, 304, and 306.

Thus, using the above example circuit 300, in an emergency stop situation, power instructions can be executed by the system, such as 100, to stop all power at a particular instant to all system equipment, such as the robot 302, fixture 304, and docking station 306. Furthermore, in an example of a safety stop situation, power instructions can be executed by the system 100 to limit power at a particular instant to certain equipment, but maintain a certain amount of power on, for example, the robot 302, to prevent the robot 302 from dropping a mounted fixture, such as 304, or moving any further than the current position of the robot 302.

Similarly, air, communications, or other utility instructions can be transmitted from the robot 302 to the fixture 304 via the interface 308. Air, communications, or other utility instructions can include transmitting air, communications, or other utilities to different system components, such as the robot and/or workstation, at particular times depending on certain circumstances. In other embodiments of a circuit for a system in accordance with the invention, other instructions can be provided depending on certain circumstances. In this example, air instructions can be communicated between the robot 302 and fixture 304 via pin A 334 associated with interface 308. Communications instructions can be communicated between the robot 302 and fixture 304 via pin F 336, pin G 338, and pin H 340 associated with interface 308.

Furthermore, air, communications, or other utility instructions can be transmitted from the docking station 306 to the fixture 304 via the interface 320. In this example, communications instructions can be communicated between the docking station 306 and fixture 304 via pin F 342, pin G 344, and pin H 346 associated with interface 320. Communications processing by the docking station 306 can be handled by an associated switch 348, such as an Ethernet switch. In some embodiments, a similar type of logic, processing, or switching device can be associated with other system components, or may be located remotely from the docking station 306. As shown in FIG. 3, a communication link 350, such as a dedicated line or network Ethernet cable, may exist between the docking station 306 and the robot 302, in order to facilitate and coordinate communications between the various components.

The circuit 300 of FIG. 3 is shown by way of example only, and other embodiments of a circuit including some or all of the foregoing components and relationships can exist in accordance with the invention. Other embodiments can include LAN, WAN, Internet, and other network communication configurations.

Figure 4:
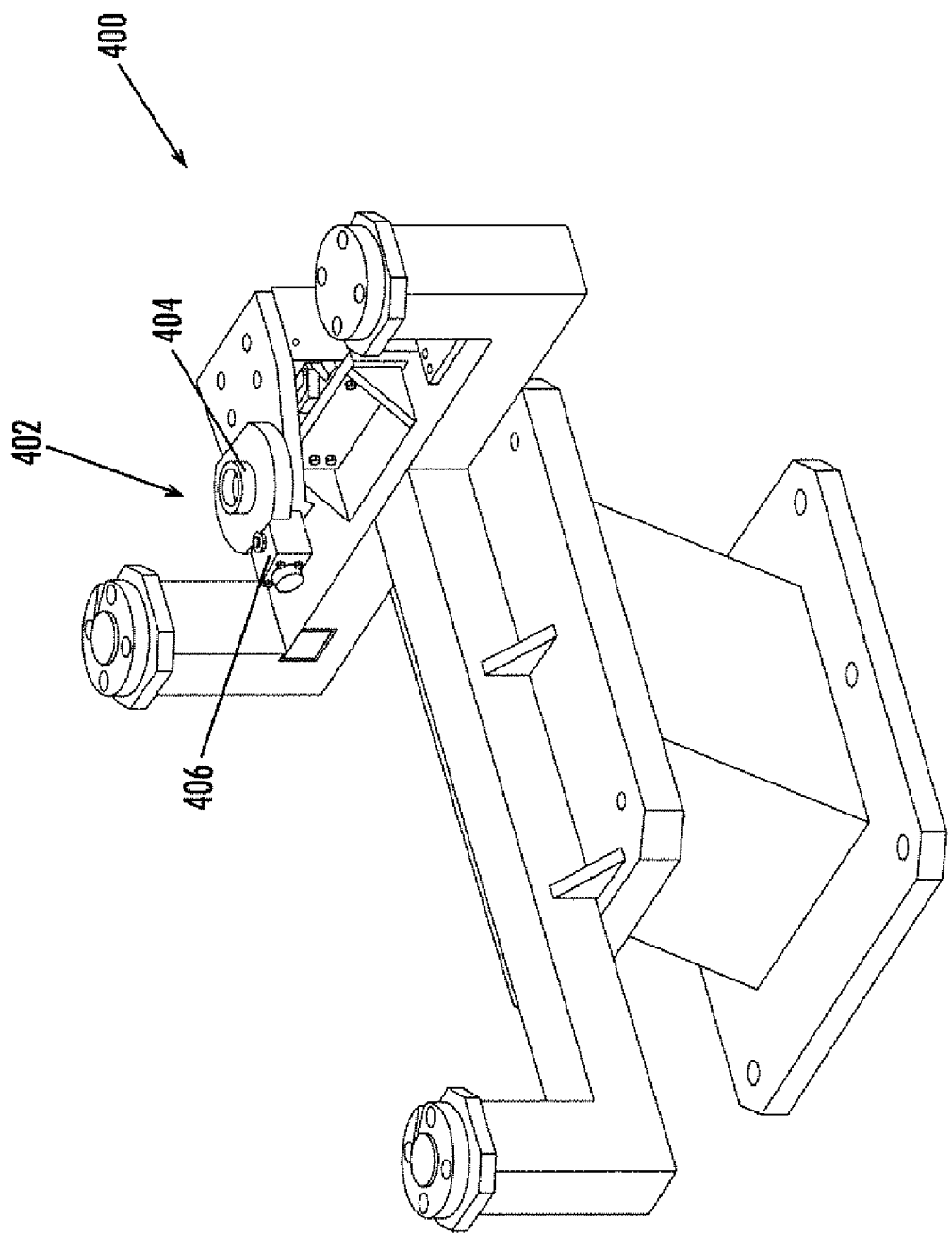
FIGS. 4-10 illustrate examples of apparatus in accordance with embodiments of the invention.
Figure 5:
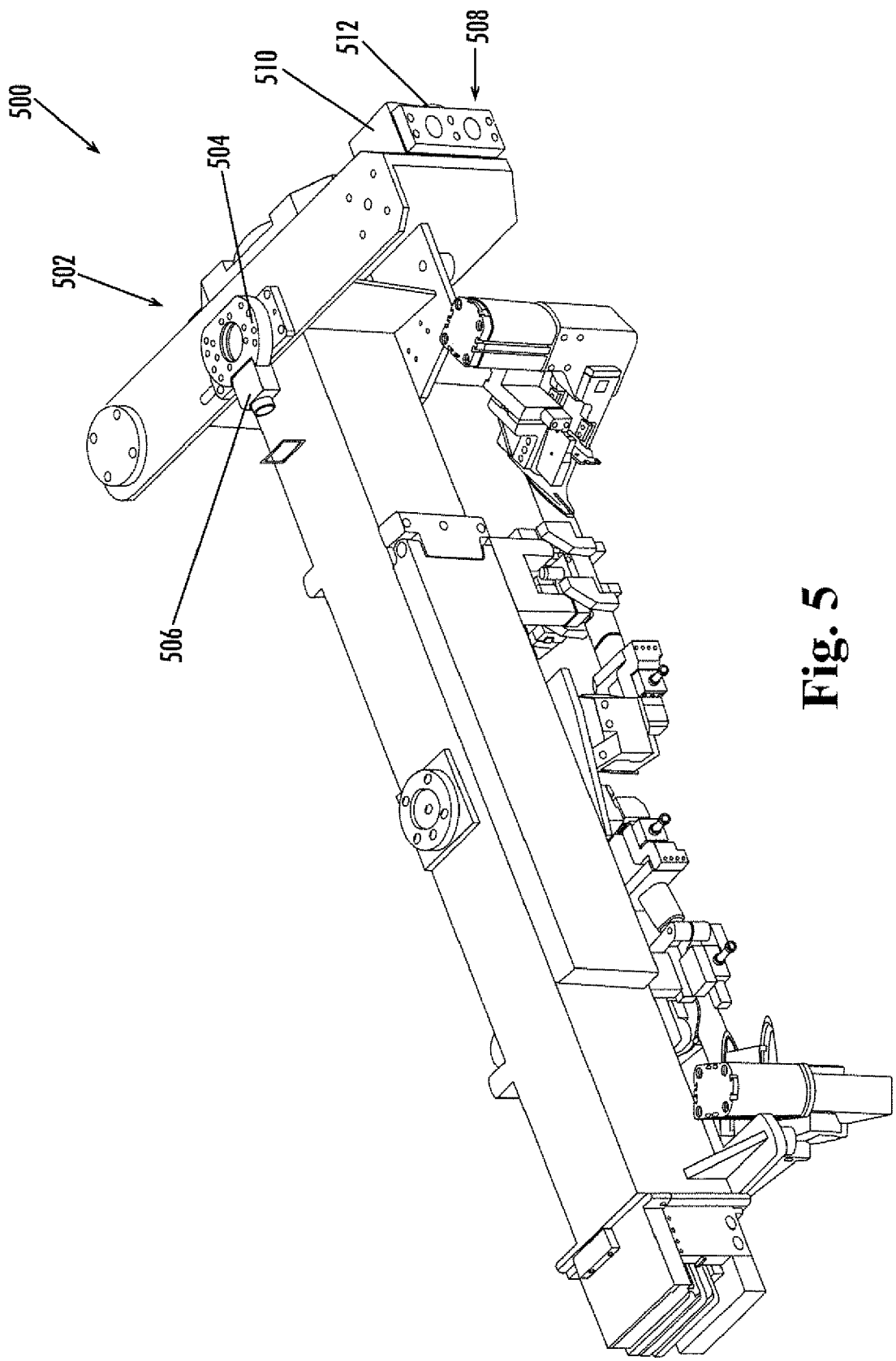
Figure 6:
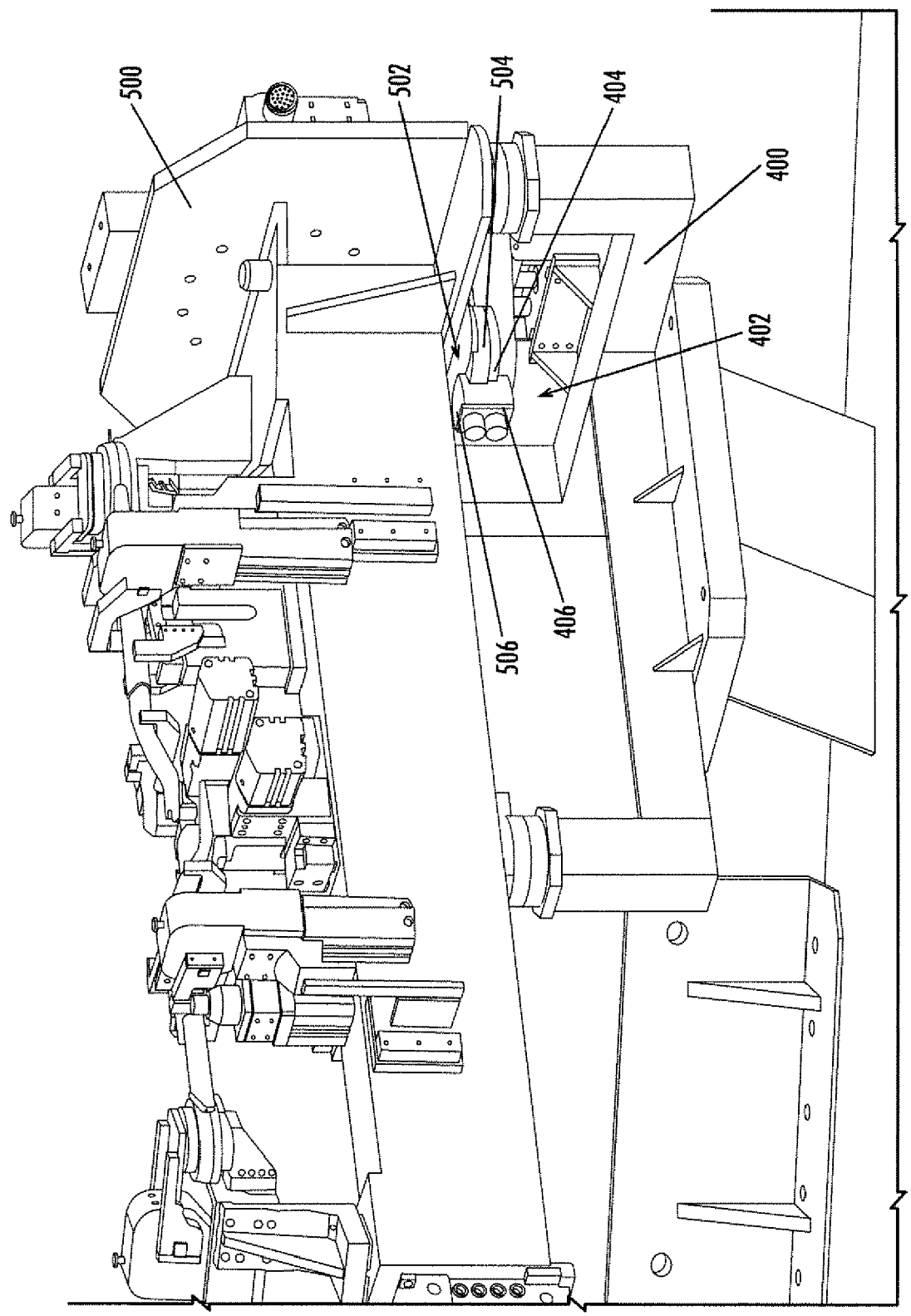
Figure 7:
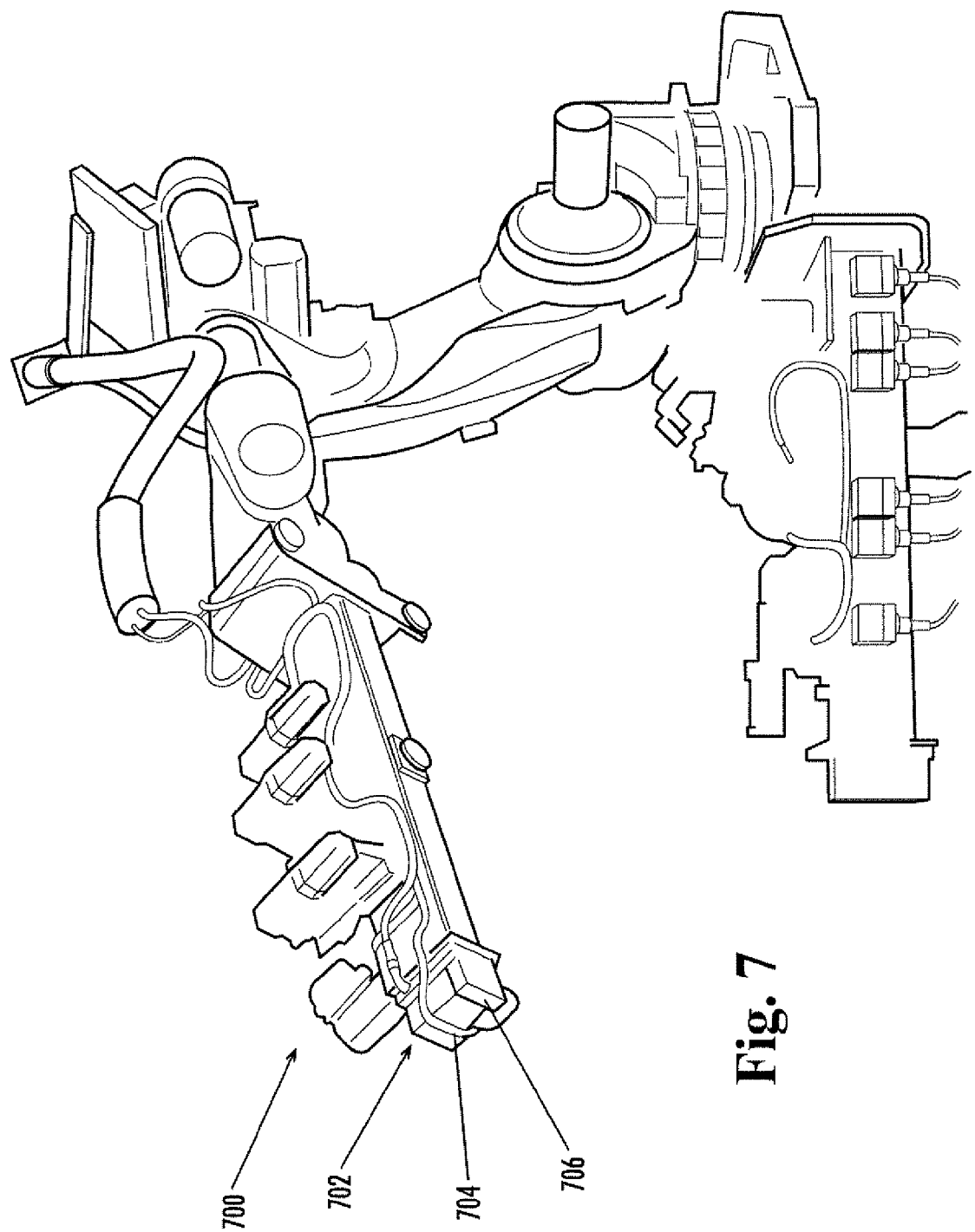
Figure 8:
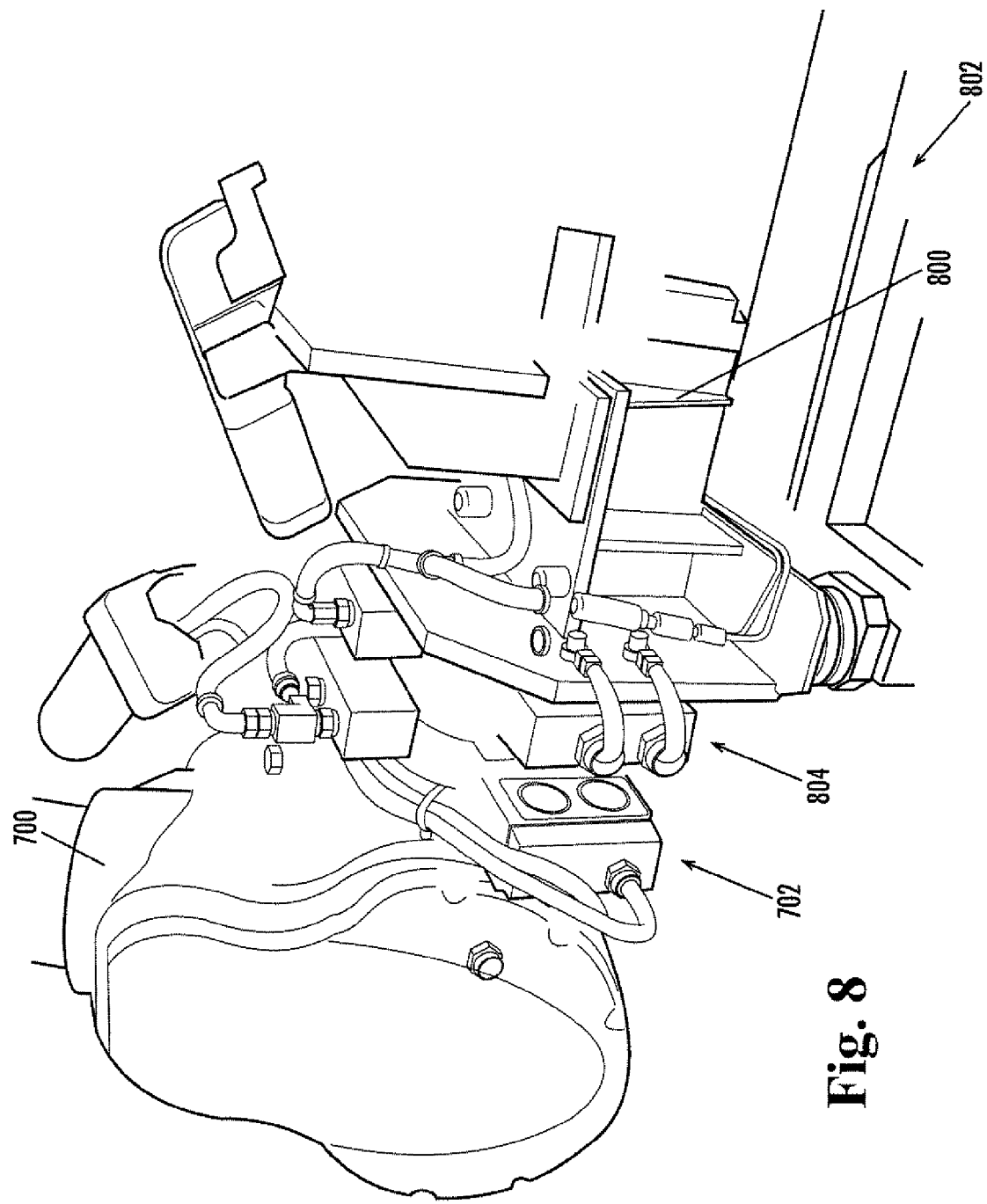
Figure 9:
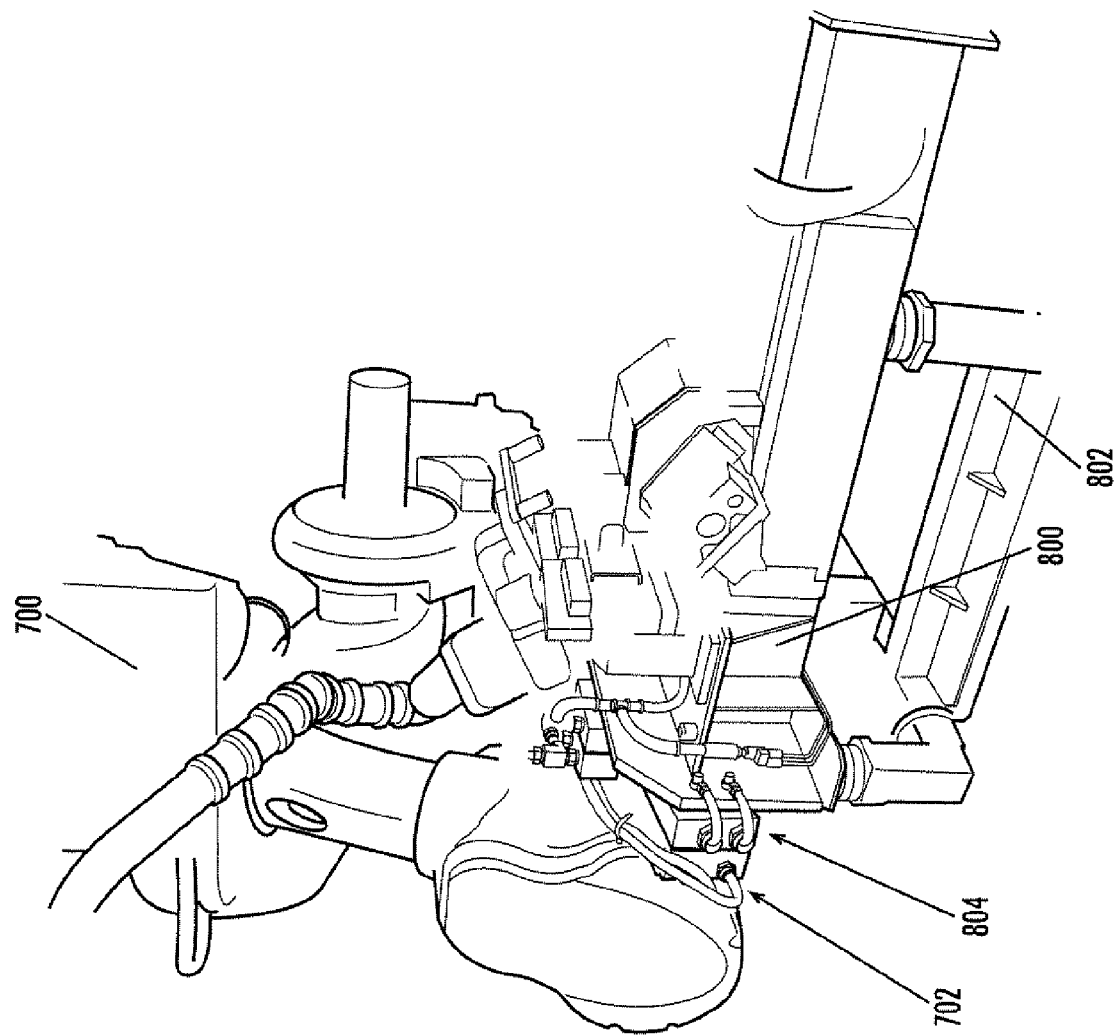
Figure 10:
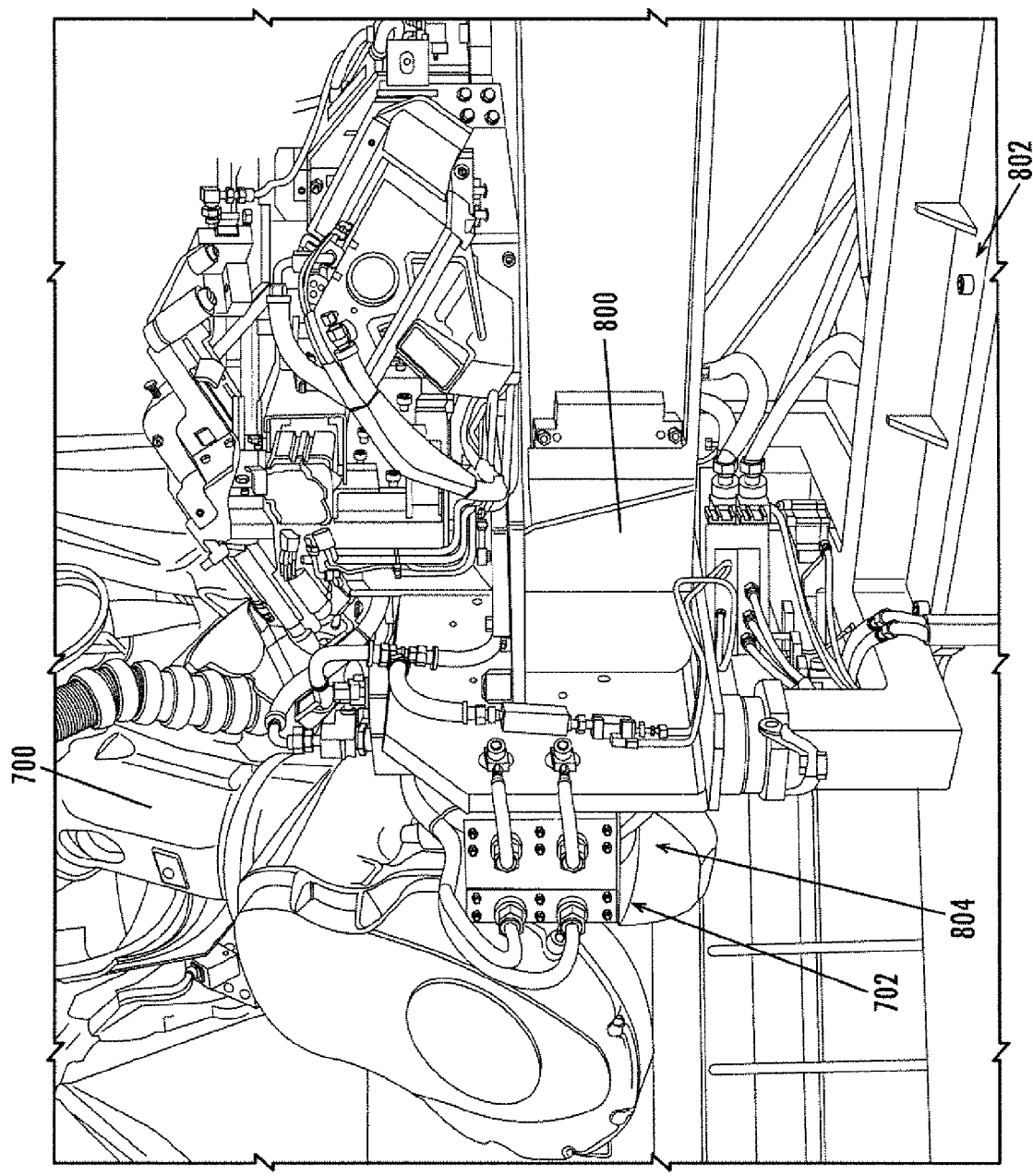

FIGS. 4-10 illustrate examples of an apparatus in accordance with embodiments of the invention. FIG. 4 illustrates an example workstation apparatus, FIG. 5 illustrates an example fixture apparatus, and FIG. 7 illustrates an example robot apparatus in accordance with embodiments of the invention. FIG. 6 illustrates an example fixture apparatus mounted to an example workstation apparatus. FIGS. 8-10 illustrate an example robot apparatus mounted to an example fixture apparatus. Other examples of apparatus, and configurations for mounting a fixture to a workstation, and a robot to a fixture can exist in other embodiments of the invention.

FIG. 4 is a perspective side view of an example workstation apparatus in accordance with an embodiment of the invention. The workstation 400 shown includes a fixture mount 402, which includes a power mount 404 and an air/communication mount 406. The fixture mount 402, shown by way of example, is an ATI-type quick connect device. A corresponding fixture, shown as 500 in FIG. 5, can be mounted to the workstation 400 via the fixture mount 402.

FIG. 5 is a perspective underside view of an example fixture apparatus in accordance with an embodiment of the invention. The fixture 500 shown includes a workstation mount 502, which includes a power mount 504 and an air/communication mount 506. The workstation mount 502, shown by way of example, is an ATI-type quick connect device. The fixture 500 can be mounted to the workstation 400 shown in FIG. 4 via the workstation mount 502. A robot mount 508, which includes a power mount 510 and an air/communication mount 512, is oriented on a lateral side of the fixture 500.

FIG. 6 is perspective side view of the workstation and fixture, shown in FIGS. 4 and 5 respectively, mounted to each other. The fixture 500 is shown mounted above the workstation 400, with the workstation mount 502 of the fixture 500 correspondingly mounted to the fixture mount 402 of the workstation 400. In this manner, the power mounts 404, 504 of each component 400, 500 can facilitate the transmission of power from a power source, such as 120 in FIG. 1. In addition, the air/communication mounts 406, 506 of each component 400, 500 can facilitate the transmission of air and/or communications from one or more other sources, such as 124 in FIG. 1.

When a robot, such as 108 in FIG. 2, is deployed and mounted to the fixture 500 shown in FIG. 5 via the robot mount 508. A corresponding mount such as 126, associated with the robot 108 can transmit power to the fixture 500 via the power mount 510. Likewise, the corresponding mount 126 associated with the robot 108 can transmit air and/or communications to the fixture 500 via the air/communication mount 512.

FIG. 7 is a perspective side view of an example robot apparatus in accordance with an embodiment of the invention. The robot 700 shown includes a fixture mount 702, which includes a power mount 704 and an air/communication mount 706. The workstation mount 702, shown by way of example, is an ATI-type quick connect device. The robot 700 can be mounted to the fixture 500 shown in FIG. 5 via the fixture mount 702.

FIG. 8 illustrates the robot 700 shown in FIG. 7 in proximity to an example fixture 800 mounted to an example workstation 802. In this embodiment, the fixture mount 702 is being aligned to a corresponding mount 804 associated with the fixture 800, similar to the fixture mount 126 of the robot 108 in FIG. 1.

FIGS. 9 and 10 illustrate the robot 700 of FIGS. 7 and 8 in a docking or mounting position relative to the example fixture 800 of FIG. 8. In this embodiment, the robot 700 is docked or mounted to the example fixture 800 via the fixture mount 702 and corresponding mount 804 associated with the fixture 800.

Figure 11:
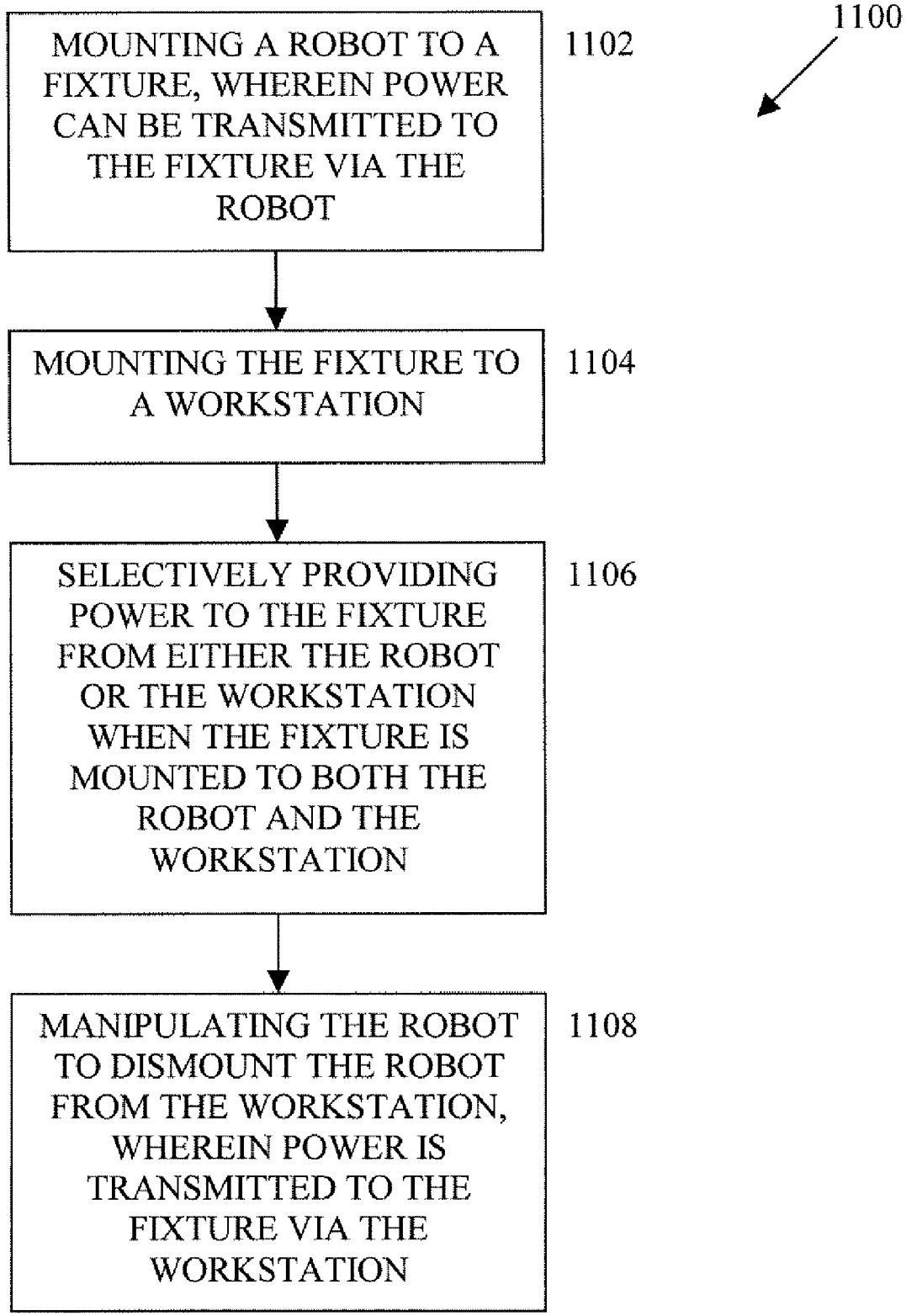
FIGS. 11-14 are flowcharts for example methods in accordance with an embodiment of the invention.

One example of a method for providing continuous power to a fixture in a manufacturing process is described in FIG. 11. The example method 1100 can be performed using some or all of the components of a system such as 102 in FIGS. 1 and 2.

The method 1100 shown in FIG. 11 begins at block 1102. In block 1102, a robot is mounted to a fixture, wherein power can be transmitted to the fixture via the robot. For example, as shown in FIG. 2, a fixture, such as 104, can include a robot mount, such as 114. The robot mount 114 can include a power mount, such as 128, in communication with at least one power source, such as 120. The robot, such as 108, can include a corresponding mount 126. In addition, the mount 126 can include a power mount 144 in communication with at least one power source, such as 120. As shown in FIG. 2, the robot 108 can mount to the fixture 104.

In one aspect of this embodiment, the fixture comprises a tool for use in a manufacturing process.

Block 1102 is followed by block 1104, in which the fixture is mounted to a workstation. For example, as shown in FIG. 1, the fixture 104 can include a workstation mount, such as 112. The workstation mount 112 can include a power mount, such as 118. A workstation 106 can include a fixture mount 116. The fixture mount 116 can include a power mount 138 in communication with at least one power source, such as 120. Shown in FIG. 1, the fixture 104 can be mounted to the workstation 106.

Block 1104 is followed by block 1106, in which power is selectively provided to the fixture from either the robot or the workstation when the fixture is mounted to both the robot and the workstation. For example, as shown in FIGS. 1 and 2, a control device such as a main control device 110 can selectively provide power to a fixture, such as 104, via a fixture mount, such as 112, when the fixture 104 is mounted to a workstation 106 (shown in FIG. 1), or via a robot mount, such as 114, when a robot, such as 108, is mounted to the fixture 104 (shown in FIG. 2), or via either mount 112, 114 when both the robot 108 and workstation 106 are mounted to the fixture 104.

In one aspect of this embodiment, the robot comprises at least one of the following: a robotic arm, or automated equipment for use in a manufacturing process.

Block 1106 is followed by block 1108, in which the robot is manipulated to dismount from the workstation, wherein power is transmitted to the fixture via the workstation. For example, as shown in FIG. 1, the workstation 106 can provide power from the power source 120 to the fixture 104 when the robot 108 is dismounted from the fixture 104.

In one aspect of this embodiment, selectively providing power to the fixture can be facilitated by at least one of the following: a programmable logic controller, a processor, or a software program.

In block 1108, the method 1100 ends.

Figure 12:
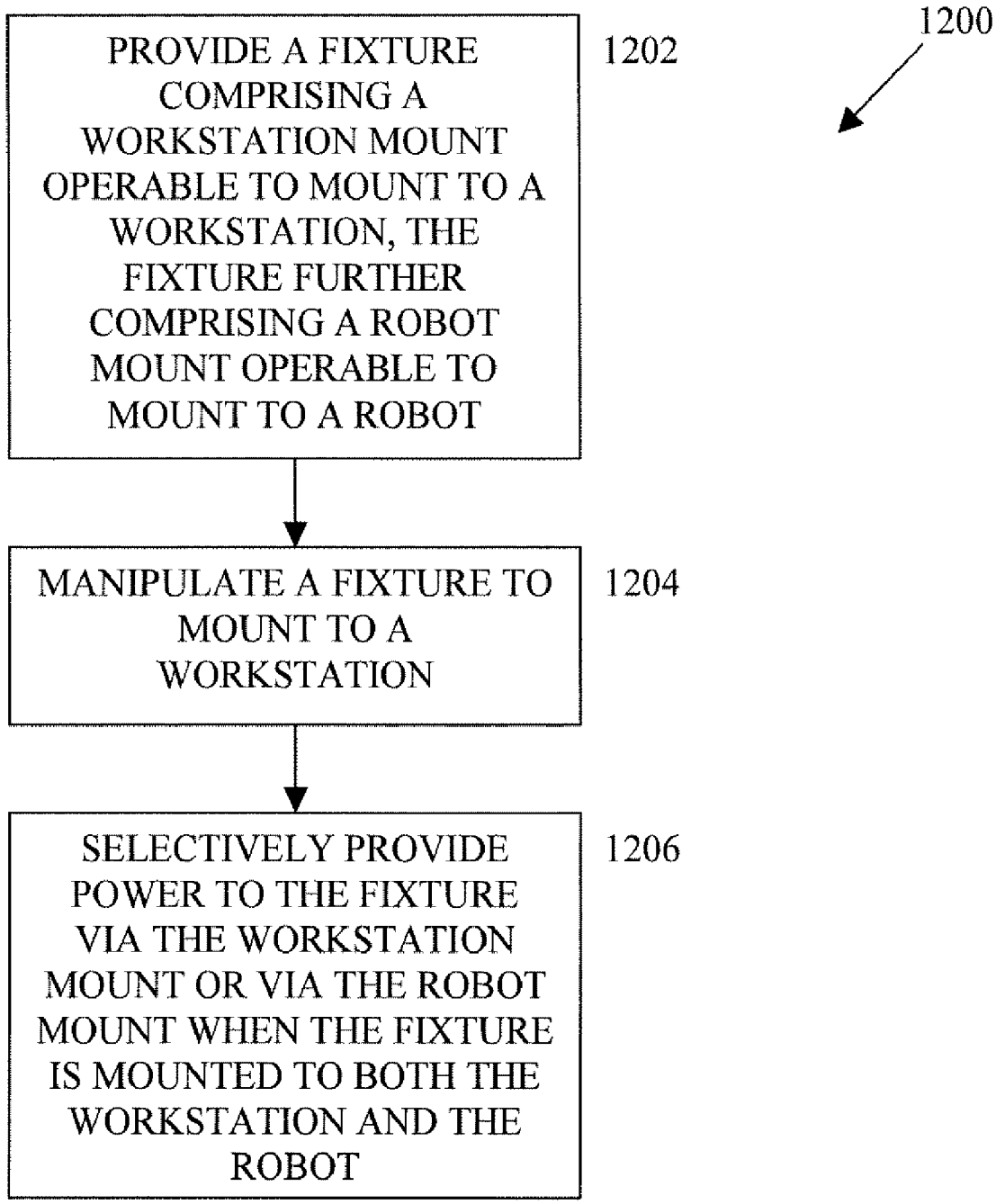

An example method of using a fixture apparatus in a manufacturing process is described in FIG. 12. The example method 1200 can be performed using some or all of the components of a system such as 102 in FIGS. 1 and 2, or the fixture 500 in FIG. 5.

In block 1202, a fixture comprising a workstation mount operable to mount to a workstation is provided. In this embodiment, the fixture further comprises a robot mount operable to mount to a robot. In one aspect of this embodiment, the fixture can include a tool for use in a manufacturing process.

Block 1202 is followed by block 1204, in which the fixture is manipulated to mount to a workstation.

Block 1204 is followed by block 1206, in which power is selectively provided to the fixture via the workstation mount or via the robot mount when the fixture is mounted to both the workstation and the robot.

In one aspect of this embodiment, the method 1200 can include selectively providing power to the fixture via the workstation mount when the fixture is exclusively mounted to a workstation, or via the robot mount when the fixture is exclusively mounted to the robot.

In another aspect of this embodiment, the method 1200 can include manipulating the fixture to dismount from the workstation, wherein power is transmitted to the fixture via the robot.

In another aspect of this embodiment, selectively providing power to the fixture can be facilitated by at least one of the following: a programmable logic controller, a processor, or a software program The method 1200 ends at block 1206.

Figure 13:
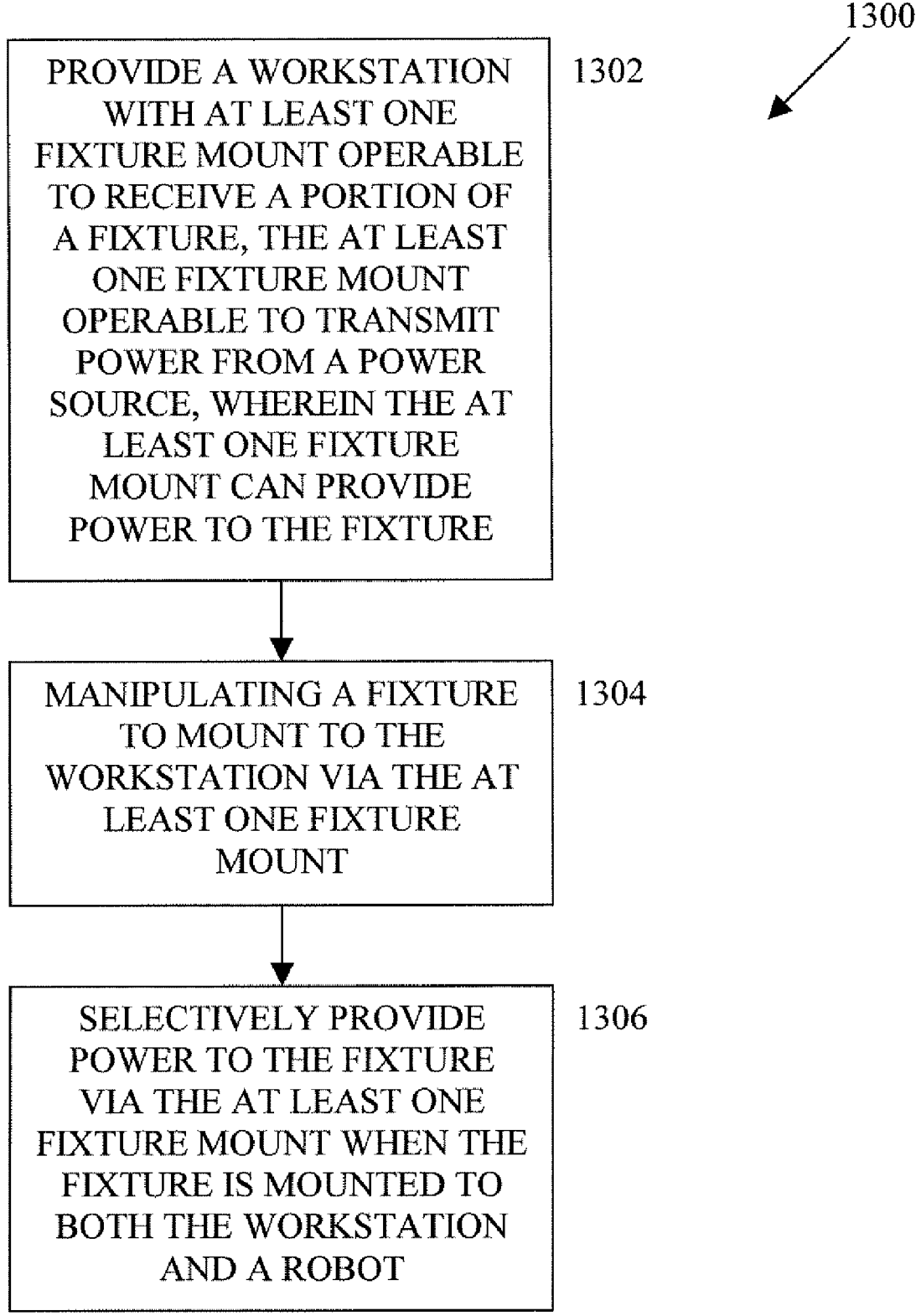

An example method of using a workstation apparatus in a manufacturing process is described in FIG. 13. The example method 1300 can be performed using some or all of the components of a system such as 102 in FIGS. 1 and 2, or the workstation shown as 400 in FIG. 4.

The method 1300 begins at block 1302, in which a workstation with at least one fixture mount is provided. In this embodiment, the at least one fixture mount is operable to transmit power from a power source, wherein the at least one fixture can provide power to the fixture.

Block 1302 is followed by block 1304, in which a fixture is manipulated to mount to the workstation via the at least one fixture mount. In one aspect of this embodiment, the fixture comprises a tool for use in a manufacturing process.

Block 1304 is followed by block 1306, in which power is selectively provided to the fixture via the at least one fixture mount when the fixture is mounted to both the workstation and the robot.

In one aspect of this embodiment, the method 1300 can include selectively providing power to the fixture via the at least one fixture mount when the fixture is exclusively mounted to the workstation, or via the robot when the fixture is exclusively mounted to the robot.

In another aspect of this embodiment selectively providing power to the fixture can be facilitated by at least one of the following: a programmable logic controller, a processor, or a software program.

The method 1300 ends at block 1306.

Figure 14:
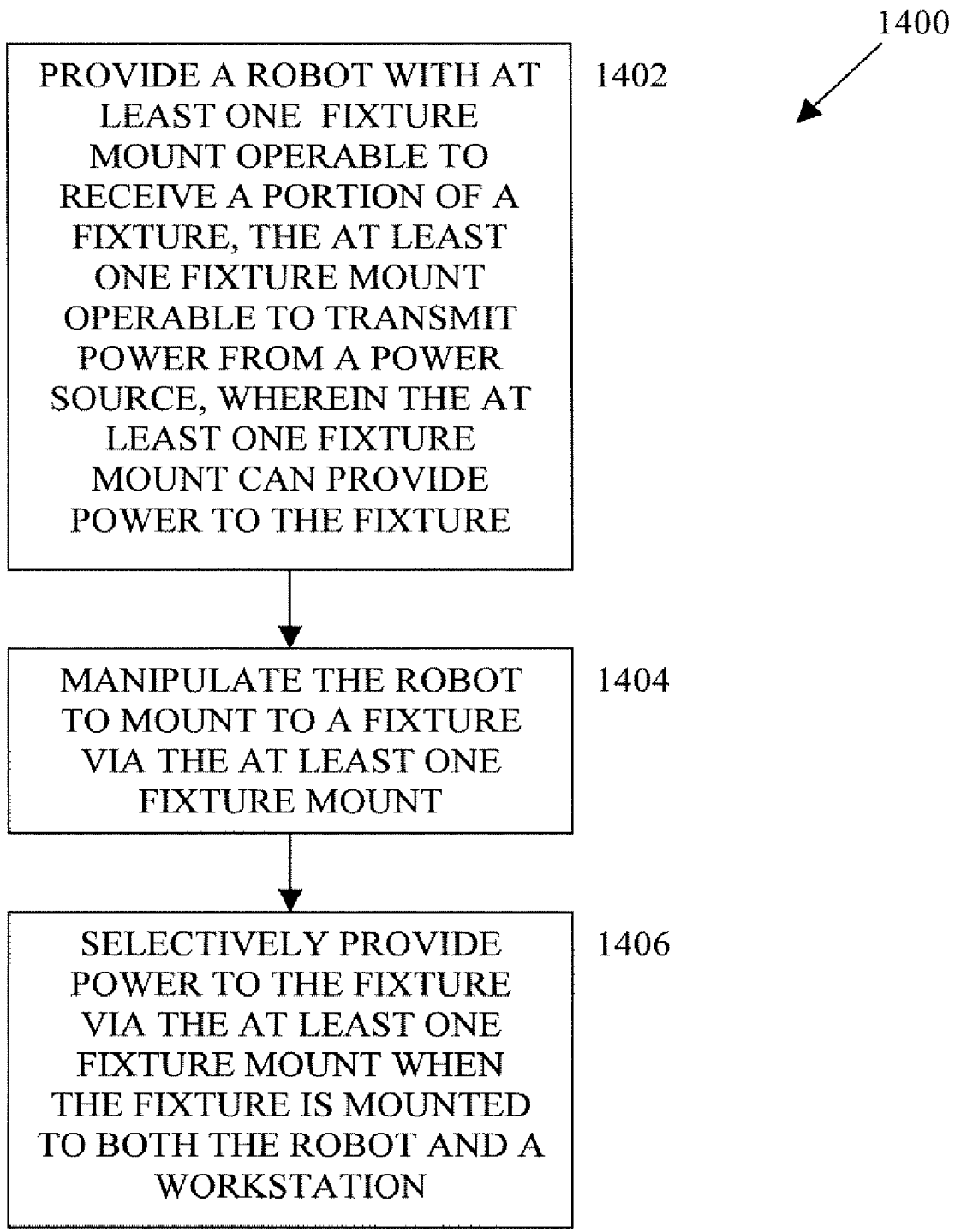

An example method of using a robot apparatus in a manufacturing process with a workstation is described in FIG. 14. The example method 1400 can be performed using some or all of the components of a system such as 102 in FIGS. 1 and 2, or by the robot 500 shown in FIG. 5.

The method 1400 begins at block 1402, in which a robot with a fixture mount operable to receive a portion of a fixture is provided. In this embodiment, the fixture mount comprises a power mount in communication with at least one power source, wherein the power mount can provide power to the fixture. In one aspect of this embodiment, the fixture can include a tool for use in a manufacturing process.

Block 1402 is followed by block 1404, in which a robot with at least one fixture mount operable to receive a portion of a fixture is provided. In this embodiment, the at least one fixture mount is operable to transmit power from a power source, wherein the at least one fixture mount can provide power to the fixture.

Block 1404 is followed by block 1406, in which the robot is manipulated to mount to a fixture via the at least one fixture mount when the fixture is mounted to both the robot and a workstation.

In one aspect of this embodiment, the method 1400 can include selectively providing power to the fixture via the at least one fixture mount when the fixture is exclusively mounted to the robot, or via a workstation when the fixture is exclusively mounted to the workstation.

In another aspect of this embodiment, selectively providing power to the fixture can be facilitated by at least one of the following: a programmable logic controller, a processor, or a software program.

The method 1400 ends at block 1406.

The methods disclosed herein are by way of example only, and other methods in accordance with embodiments of the invention can include other elements or steps, including fewer or greater numbers of element or steps than the example methods described herein.

While the above description contains many specifics, these specifics should not be construed as limitations on the scope of the invention, but merely as exemplifications of the disclosed embodiments. Those skilled in the art will envision many other possible variations that are within the scope of the invention as defined by the claims appended hereto.

The claimed invention is:

1. A system for providing continuous power from a power source to a fixture in a manufacturing process, the system comprising:
    a workstation;
    a robot operable to perform at least one manufacturing task associated with at least one manufacturing component;
    a fixture comprising:
        at least one robot mount operable to mount to and to receive power from the robot;
        at least one workstation mount operable to mount to and to receive power from the workstation;
        at least one power driven device to maintain an initial configuration of the at least one manufacturing component and operable to receive power via at least one of the at least one robot mount and the at least one workstation mount;
        a local control device operable for signal transmission with at least one main control device, the local control device comprising at least one of a programmable logic controller or a processor-based controller; and
    the at least one main control device configured to selectively transmit power to the fixture via at least one of the at least one robot mount or the at least one workstation mount with the fixture being mounted to both the workstation and the robot.

2. The system of claim 1, wherein the at least one main control device is configured to selectively transmit power to the fixture via the workstation when the fixture is exclusively mounted to a workstation, or via the robot when the fixture is exclusively mounted to the robot.

3. The system of claim 1, wherein the manufacturing process comprises at least one of the following: a bicycle frame assembly process, a bicycle assembly process, a motorcycle assembly process, an automobile assembly process, or an appliance assembly process or plant.

4. The system of claim 1, wherein the robot comprises at least one of the following: a robotic arm, or automated equipment for use in a manufacturing process.

5. The system of claim 1, wherein the workstation comprises a base station in a manufacturing process.

6. The system of claim 1, wherein the fixture comprises a tool for use in a manufacturing process.

7. The system of claim 1, wherein the at least one robot mount comprises a quick change connector device.

8. The system of claim 1, wherein the at least one workstation mount comprises a quick change connector device.

9. A system for providing continuous power from a power source to a fixture in a manufacturing process, the system comprising:
    a plurality of workstations, each workstation comprising a mount operable to receive a portion of a fixture and further operable to receive power from at least one power source, wherein the mount can transmit power to a fixture when the fixture is mounted to the respective workstation;
    a plurality of robots, each operable to perform at least one manufacturing task associated with at least one manufacturing component, wherein each robot comprises a mount operable to receive a portion of a fixture and further operable to receive power from at least one power source, wherein the mount can transmit power to a fixture when the fixture is mounted to the respective robot;
    at least one fixture comprising:
        a robot mount operable to receive a portion of a robot, wherein the robot mount is operable to transmit power to the at least one fixture when a robot is mounted to the at least one fixture;
        a workstation mount operable to receive a portion of a workstation, wherein the workstation mount is operable to transmit power to the at least one fixture when the at least one fixture is mounted to a workstation;
        at least one power driven device to maintain an initial configuration of the at least one manufacturing component and operable to receive power via at least one of the robot mount and the workstation mount; and
        a local control device operable for signal transmission with at least one main control device, the local control device comprising at least one of a programmable logic controller or a processor-based controller; and
    the at least one main control device configured selectively transmit power to the at least one fixture via a workstation or a robot when the at least one fixture is mounted to both the workstation and the robot, and further configured to selectively transmit power to the at least one fixture via a workstation when the at least one fixture is exclusively mounted to the workstation, or via a robot when the at least one fixture is exclusively mounted to the robot.

10. A method for providing continuous power to a fixture in a manufacturing process, the method comprising:
    providing a workstation;
    providing a robot operable to perform at least one manufacturing task associated with at least one manufacturing component;
    providing a fixture comprising:
        a robot mount operable to receive a portion of a robot, wherein the robot mount is operable to transmit power to the fixture when a robot is mounted to the fixture;
        a workstation mount operable to receive a portion of a workstation, wherein the workstation mount is operable to transmit power to the fixture when a workstation is mounted to the fixture;
        at least one power driven device to maintain an initial configuration of the at least one manufacturing component and operable to receive power via at least one of the robot mount and the workstation mount; and a local control device operable for signal transmission with at least one main control device, the local control device comprising at least one of a programmable logic controller or a processor-based controller;

manipulating the robot to mount the fixture to the workstation, wherein the robot can provide power via the robot mount to the fixture; and selectively providing power to the fixture from either the robot or the workstation with the fixture being mounted to both the robot and the workstation, wherein selectively providing power to the fixture is facilitated by the at least one main control device, wherein the at least one main control device comprises at least one of the following: a programmable logic controller, a processor, or a software program.

11. The method of claim 10, further comprising:
selectively providing power to the fixture via the workstation mount when the fixture is exclusively mounted to a workstation, or via the robot mount when the fixture is exclusively mounted to the robot.

12. The method of claim 10, wherein the robot comprises at least one of the following: a robotic arm, or automated equipment for use in a manufacturing process.

13. The method of claim 10, wherein the fixture comprises a tool for use in a manufacturing process.

14. The method of claim 10, wherein the robot mount comprises a quick change connector device.

15. The method of claim 10, wherein the workstation mount comprises a quick change connector device.

16. A method for providing continuous power to a fixture in a manufacturing process utilizing at least one workstation and at least one robot, the method comprising:

mounting a robot to a fixture, wherein the robot is operable to perform at least one manufacturing task associated with at least one manufacturing component, wherein the fixture comprises at least one power driven device to maintain an initial configuration of the at least one manufacturing component, wherein power can be transmitted to the fixture and the at least one power driven device via the robot, and wherein the fixture comprises a local control device operable for signal transmission with at least one main control device, the local control device comprising at least one of a programmable logic controller or a processor-based controller;

mounting the fixture to a workstation;

selectively providing power to the fixture from either the robot or the workstation with the fixture being mounted to both the robot and the workstation, wherein selectively providing power to the fixture is facilitated by the at least one main control device, wherein the at least one main control device comprises at least one of the following: a programmable logic controller, a processor, or a software program;

manipulating the robot to dismount the robot from the workstation, wherein power is transmitted to the fixture via the workstation.

17. The method of claim 16, wherein the robot comprises at least one of the following: a robotic arm, or automated equipment for use in a manufacturing process.

18. The method of claim 16, wherein the fixture comprises a tool for use in a manufacturing process.

19. A method of using a fixture in a manufacturing process, the method comprising:

providing a fixture comprising a workstation mount operable to mount to a workstation, the fixture further comprising: a robot mount operable to mount to a robot, and at least one power driven device to maintain an initial configuration of at least one manufacturing component associated with at least one manufacturing task, and a local control device operable for signal transmission with at least one main control device, the local control device comprising at least one of a programmable logic controller or a processor-based controller;

manipulating the fixture to mount to a workstation; and selectively providing power to the fixture and the at least one power driven device via the workstation mount or via the robot mount with the fixture being mounted to both the workstation and the robot, wherein selectively providing power to the fixture and the at least one power driven device is facilitated by the at least one main control drive, the at least one main control device comprising at least one of the following: a programmable logic controller, a processor, or a software program.

20. The method of claim 19, further comprising:
selectively providing power to the fixture and the at least one power driven device via the workstation mount when the fixture is exclusively mounted to a workstation, or via the robot mount when the fixture is exclusively mounted to the robot.

21. The method of claim 19, further comprising:
manipulating the fixture to dismount from the workstation, wherein power is transmitted to the fixture via the robot.

22. The method of claim 19, wherein the fixture comprises a tool for use in a manufacturing process.

23. A method of using a workstation in a manufacturing process with a robot, the method comprising:

providing a workstation with at least one fixture mount operable to receive a portion of a fixture comprising at least one power driven device to maintain an initial configuration of at least one manufacturing component associated with at least one manufacturing task, the at least one fixture mount operable to transmit power from a power source, wherein the at least one fixture mount can provide power to the fixture and the at least one power driven device, and wherein the fixture comprises a local control device operable for signal transmission with at least one main control device, the local control device comprising at least one of a programmable logic controller or a processor-based controller;

manipulating the fixture to mount to the workstation via the at least one fixture mount; and selectively providing power to the fixture via the at least one fixture mount with the fixture being mounted to both the workstation and a robot, wherein selectively providing power to the fixture is facilitated by the at least one main control device, the at least one main control device comprising at least one of the following: a programmable logic controller, a processor, or a software program.

24. The method of claim 23, further comprising:
selectively providing power to the fixture via the at least one fixture mount when the fixture is exclusively mounted to the workstation, or via the robot when the fixture is exclusively mounted to the robot.

25. The method of claim 23, wherein the fixture comprises a tool for use in a manufacturing process.

26. A method of using a robot in a manufacturing process with a workstation, the method comprising:

providing a robot operable to perform at least one manufacturing task associated with at least one manufacturing component, the robot comprising at least one fixture mount operable to receive a portion of a fixture comprising at least one power driven device to maintain an initial configuration of the at least one manufacturing component, the at least one fixture mount operable to transmit power from a power source, wherein the at least one fixture mount can provide power to the fixture and the at least one power driven device, and wherein the fixture comprises a local control device operable for signal transmission with at least one main control device, the local control device comprising at least one of a programmable logic controller or a processor-based controller;

manipulating the robot to mount to the fixture via the at least one fixture mount; and selectively providing power to the fixture via the at least one fixture mount with the fixture being mounted to both the robot and a workstation, wherein selectively providing power to the fixture via the at least one fixture mount is facilitated by the at least one main control device.

27. The method of claim 26, further comprising:

selectively providing power to the fixture via the at least one fixture mount when the fixture is exclusively mounted to the robot, or via a workstation when the fixture is exclusively mounted to the workstation.

28. The method of claim 26, wherein the fixture comprises a tool for use in a manufacturing process.

29. The method of claim 26, wherein the at least one main control device comprises at least one of the following: a programmable logic controller, a processor, or a software program.

30. A system for providing at least one continuous utility from a utility source to a fixture in a manufacturing process, the system comprising:

a workstation;

a robot operable to perform at least one manufacturing task associated with at least one manufacturing component;

a fixture comprising:

at least one robot mount operable to mount to and to receive at least one utility from the robot; and at least one workstation mount operable to mount to and to receive the at least one utility from the workstation;

at least one power driven device to maintain an initial configuration of the at least one manufacturing component and operable to receive the at least one utility via at least one of the at least one robot mount and the at least one workstation mount; and a local control device operable for signal transmission with at least one main control device, the local control device comprising at least one of a programmable logic controller or a processor-based controller; and the at least one main control device configured to selectively transmit the at least one utility to the fixture via at least one of the at least one robot mount or the at least one workstation mount with the fixture being mounted to both the workstation and the robot.

31. The system of claim 30, wherein the at least one utility comprises at least one of the following: communications, air, or power.

32. A method for providing at least one continuous utility to a fixture in a manufacturing process, the method comprising:

providing a workstation;

providing a robot operable to perform at least one manufacturing task associated with at least one manufacturing component;

providing a fixture comprising:

a robot mount operable to receive a portion of a robot, wherein the robot mount is operable to transmit at least one utility to the fixture when a robot is mounted to the fixture;

a workstation mount operable to receive a portion of a workstation, wherein the workstation mount is operable to transmit the at least one utility to the fixture when a workstation is mounted to the fixture;

at least one power driven device to maintain an initial configuration of the at least one manufacturing component and operable to receive the at least one utility via at least one of the robot mount and the workstation mount; and a local control device operable for signal transmission with at least one main control device, the local control device comprising at least one of a programmable logic controller or a processor-based controller; and manipulating the robot to mount the fixture to the workstation, wherein the robot can provide the at least one utility via the robot mount to the fixture; and selectively providing the at least one utility to the fixture from either the robot or the workstation with the fixture being is mounted to both the robot and the workstation wherein selectively providing the at least one utility to the fixture is facilitated by the at least one main control device.

33. The method of claim 32, wherein the at least one utility comprises at least one of the following: communications, air, or power.

* * * * *